US009802710B2

(12) United States Patent
Wirth et al.

(10) Patent No.: US 9,802,710 B2
(45) Date of Patent: Oct. 31, 2017

(54) PASSENGER SUPPLY SYSTEM FOR INSTALLATION IN A PASSENGER SUPPLY CHANNEL

(71) Applicant: Airbus Operations GmbH, Hamburg (DE)

(72) Inventors: Tobias Wirth, Hamburg (DE); Sebastian Umlauft, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 742 days.

(21) Appl. No.: 14/269,715

(22) Filed: May 5, 2014

(65) Prior Publication Data

US 2014/0329452 A1   Nov. 6, 2014

(30) Foreign Application Priority Data

May 6, 2013   (EP) ..................................... 13166672

(51) Int. Cl.
*B60H 1/34*   (2006.01)
*B64D 13/06*   (2006.01)
(Continued)

(52) U.S. Cl.
CPC .............. *B64D 13/06* (2013.01); *B64D 11/00* (2013.01); *B64D 11/0015* (2013.01); *B64F 5/10* (2017.01);
(Continued)

(58) Field of Classification Search
CPC .... B64D 13/00; B64D 13/06; B64D 13/0015; B64F 5/10
(Continued)

(56) References Cited

U.S. PATENT DOCUMENTS

| 5,707,028 A | * | 1/1998 | Roeper | ..................... H02G 3/14 |
| | | | | 244/118.5 |
| 6,267,428 B1 | * | 7/2001 | Baldas | ...................... B60R 7/04 |
| | | | | 296/37.1 |

(Continued)

FOREIGN PATENT DOCUMENTS

| DE | 102007014406 | 4/2008 |
| DE | 102008058271 | 5/2010 |

(Continued)

OTHER PUBLICATIONS

European Search Report, Sep. 26, 2013.

*Primary Examiner* — Steven B McAllister
*Assistant Examiner* — Jonathan Cotov
(74) *Attorney, Agent, or Firm* — Greer, Burns & Crain Ltd.

(57) ABSTRACT

A passenger supply system installed in a passenger supply channel (PSC) on board a vehicle, such as an aircraft. The supply system comprises a rail track configured to be mounted along the PSC. The supply system further comprises an indiv panel mounted on the rail track and connectable to the PSC for supplying a passenger with conditioned air, medical outlet and/or oxygen. The indiv panel comprises a crossover area. The supply system further comprises a passenger supply unit mounted on the rail track and connectable to the PSC for supplying the passenger with light, visual information and/or sound information. The supply unit comprises an overlapping area. The supply unit and the indiv panel are configured such that in a mounted state of the supply unit and of the indiv panel the overlapping area of the supply unit at least partially overlaps with the crossover area of the indiv panel.

12 Claims, 20 Drawing Sheets

(51) Int. Cl.
   *B64D 11/00* (2006.01)
   *B64F 5/10* (2017.01)
   *B64D 13/00* (2006.01)

(52) U.S. Cl.
   CPC  *B64D 2011/0053* (2013.01); *B64D 2013/003* (2013.01); *Y02T 50/46* (2013.01); *Y10T 29/49826* (2015.01); *Y10T 29/49947* (2015.01)

(58) Field of Classification Search
   USPC .......................................... 454/76; 244/118.5
   See application file for complete search history.

(56) References Cited

U.S. PATENT DOCUMENTS

| | | | | |
|---|---|---|---|---|
| 6,338,517 | B1* | 1/2002 | Canni | B60R 7/04 |
| | | | | 224/281 |
| 7,137,659 | B2* | 11/2006 | Tiesler | B60R 7/04 |
| | | | | 296/37.12 |
| 8,454,415 | B2* | 6/2013 | Nitsche | B60H 1/00371 |
| | | | | 454/76 |
| 9,067,683 | B2* | 6/2015 | Umlauft | B64D 13/00 |
| 9,481,462 | B2* | 11/2016 | Paulino | B64D 13/00 |
| 9,487,294 | B2* | 11/2016 | Umlauft | B64D 11/00 |
| 2003/0170491 | A1 | 9/2003 | Liao et al. | |
| 2010/0087130 | A1 | 4/2010 | Nitsche et al. | |
| 2010/0096919 | A1* | 4/2010 | Meckes | B60Q 3/0206 |
| | | | | 307/9.1 |
| 2011/0240796 | A1* | 10/2011 | Schneider | B64D 11/00 |
| | | | | 244/118.5 |
| 2012/0074258 | A1* | 3/2012 | Papke | B64C 1/066 |
| | | | | 244/118.5 |
| 2012/0228425 | A1* | 9/2012 | Schneider | B64D 11/003 |
| | | | | 244/118.5 |
| 2012/0312921 | A1* | 12/2012 | Grosse-Plankermann | B64D 11/003 |
| | | | | 244/118.5 |
| 2013/0105638 | A1* | 5/2013 | Umlauft | B64D 13/00 |
| | | | | 248/49 |

FOREIGN PATENT DOCUMENTS

| | | |
|---|---|---|
| DE | 102009058849 | 6/2011 |
| DE | 102010018502 | 11/2011 |
| DE | 102012018569 | 3/2014 |
| EP | 0716014 | 6/1996 |
| EP | 1339112 | 8/2003 |
| WO | 2011079906 | 7/2011 |
| WO | 2011134615 | 11/2011 |

\* cited by examiner

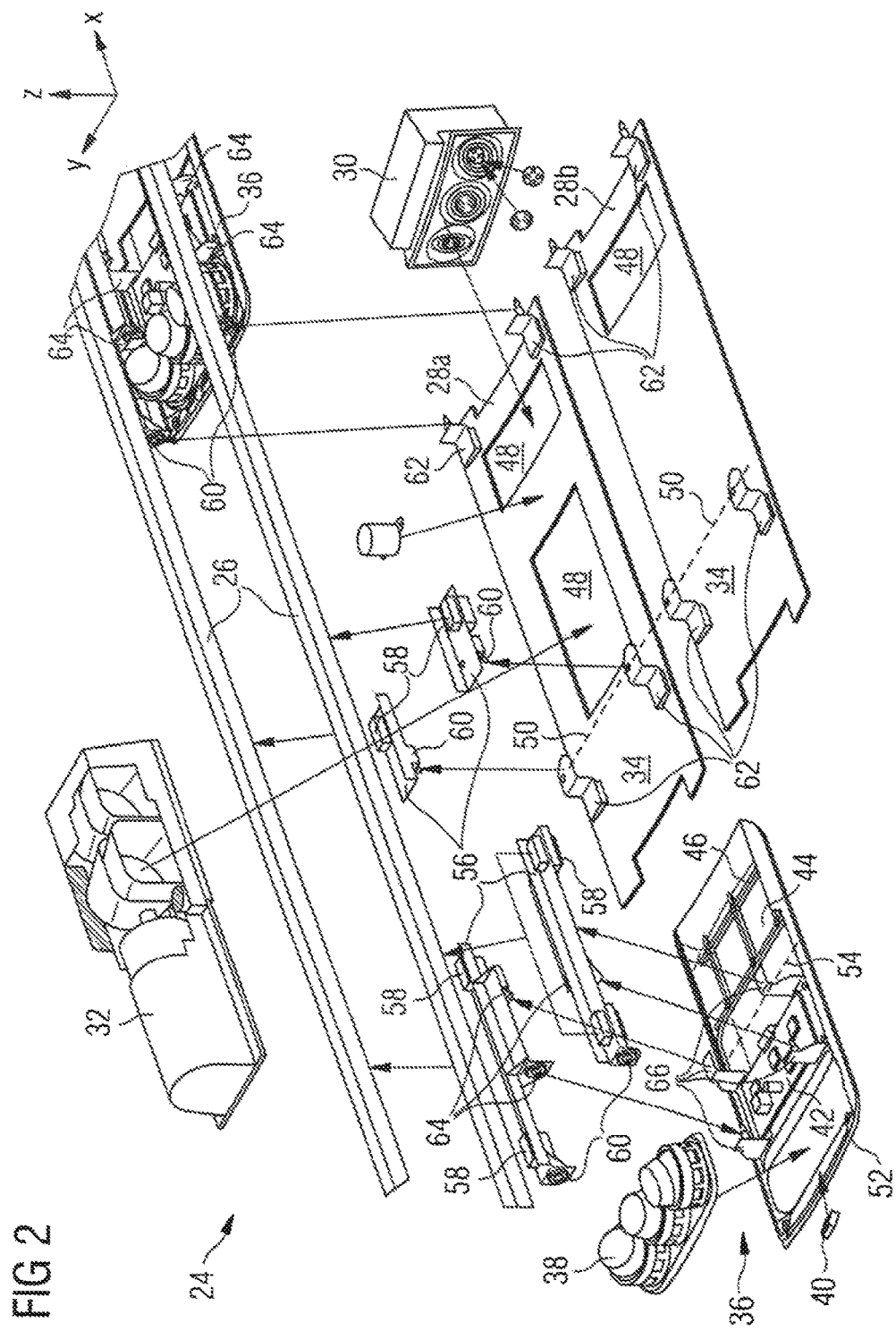

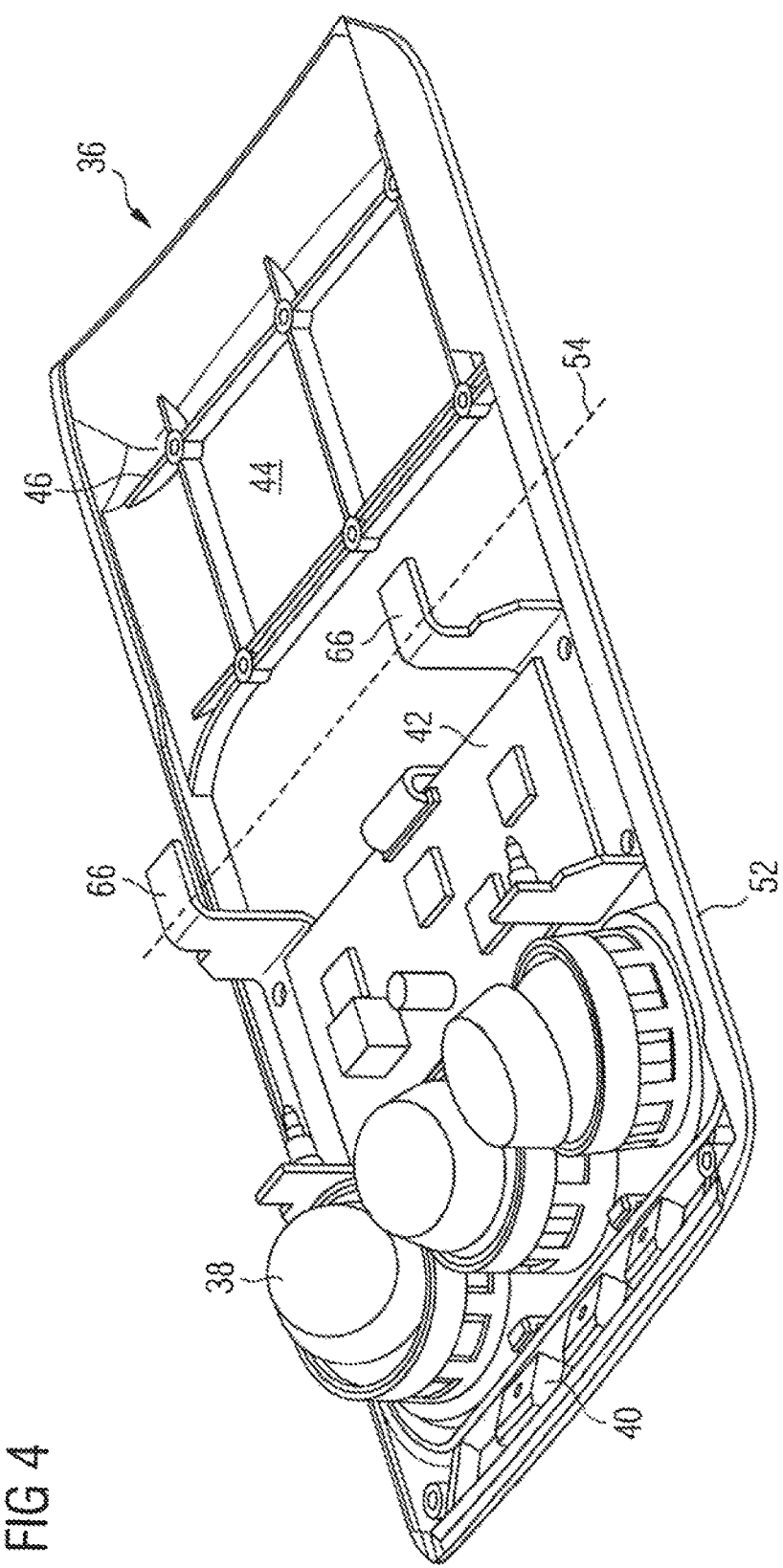

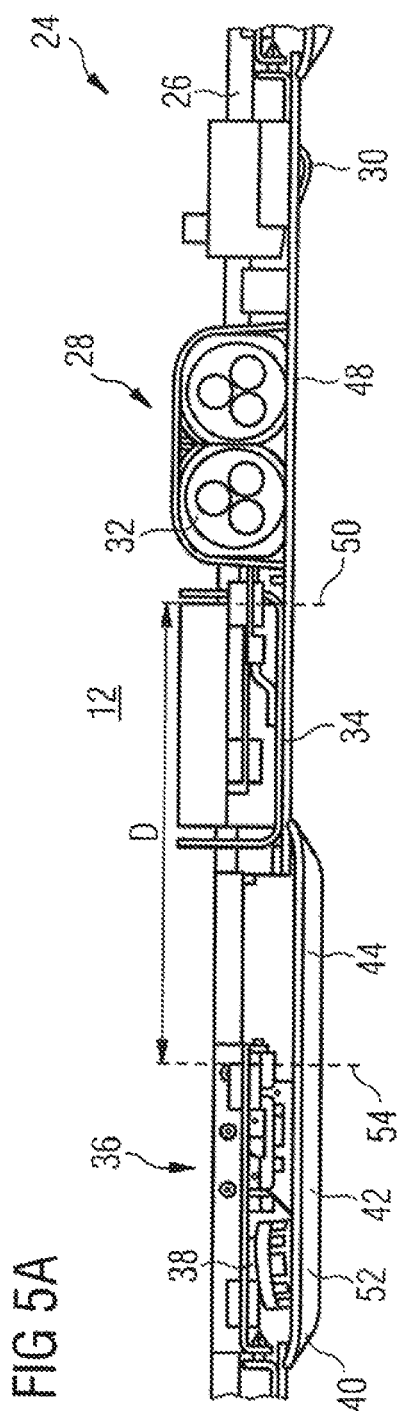
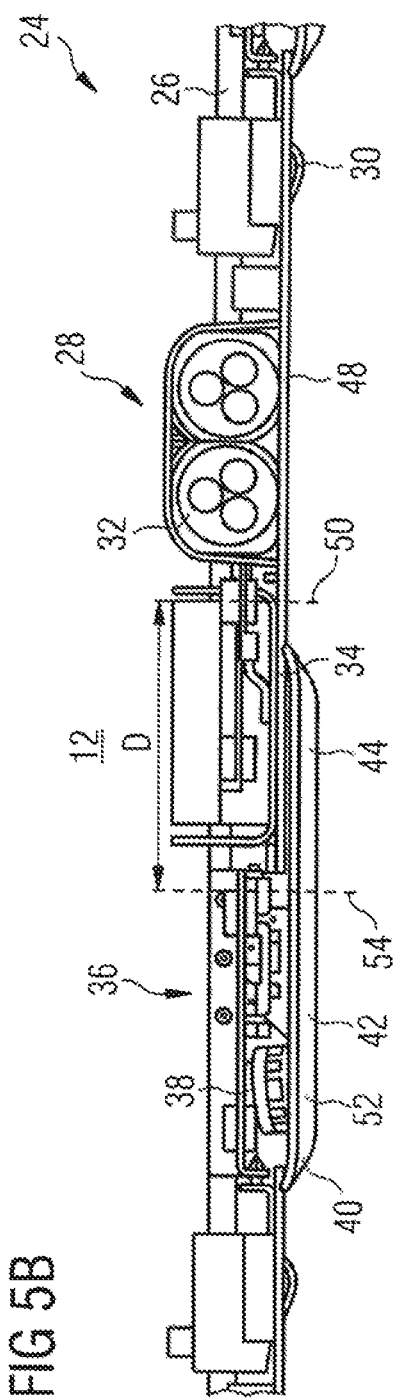

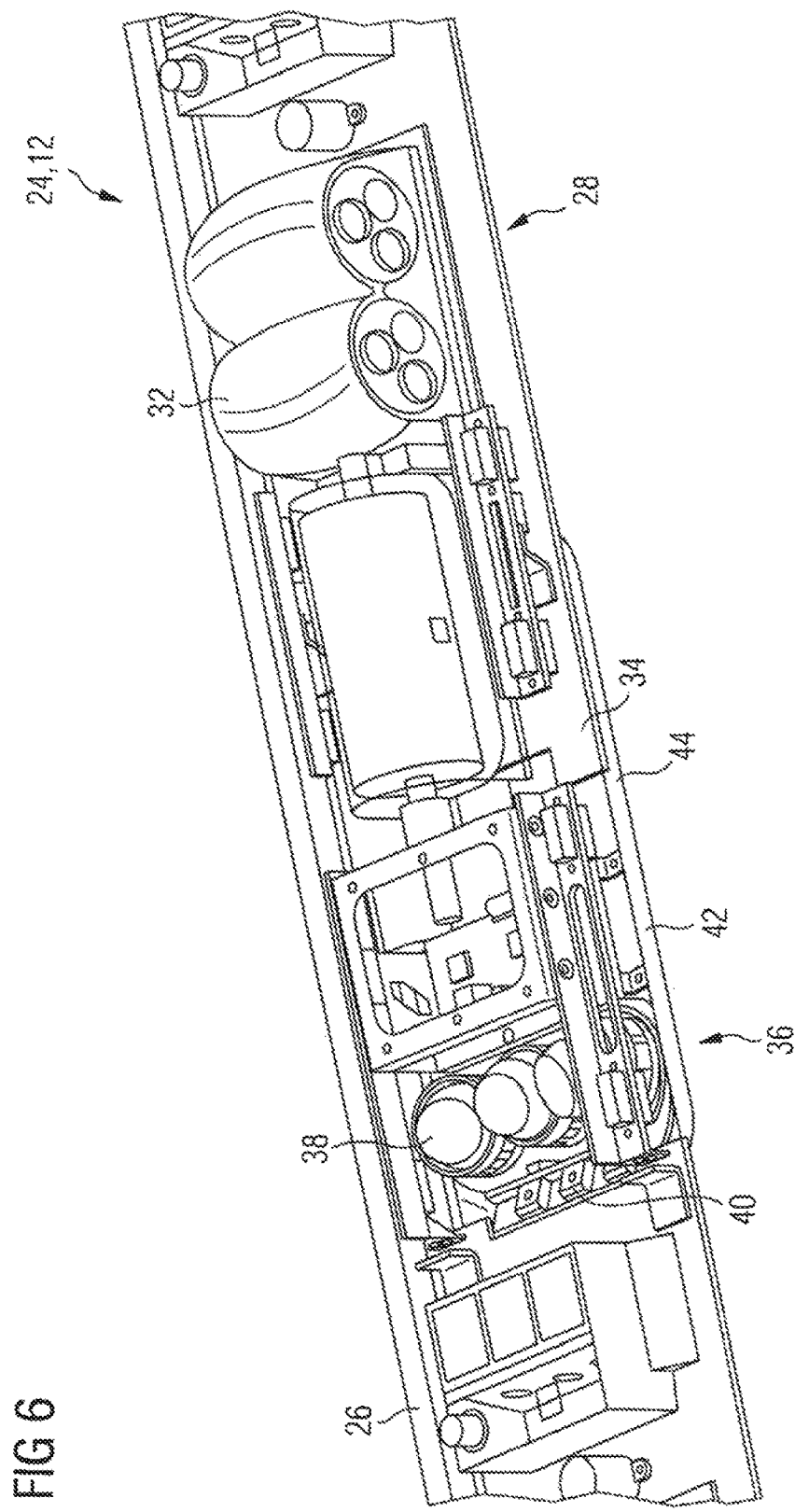

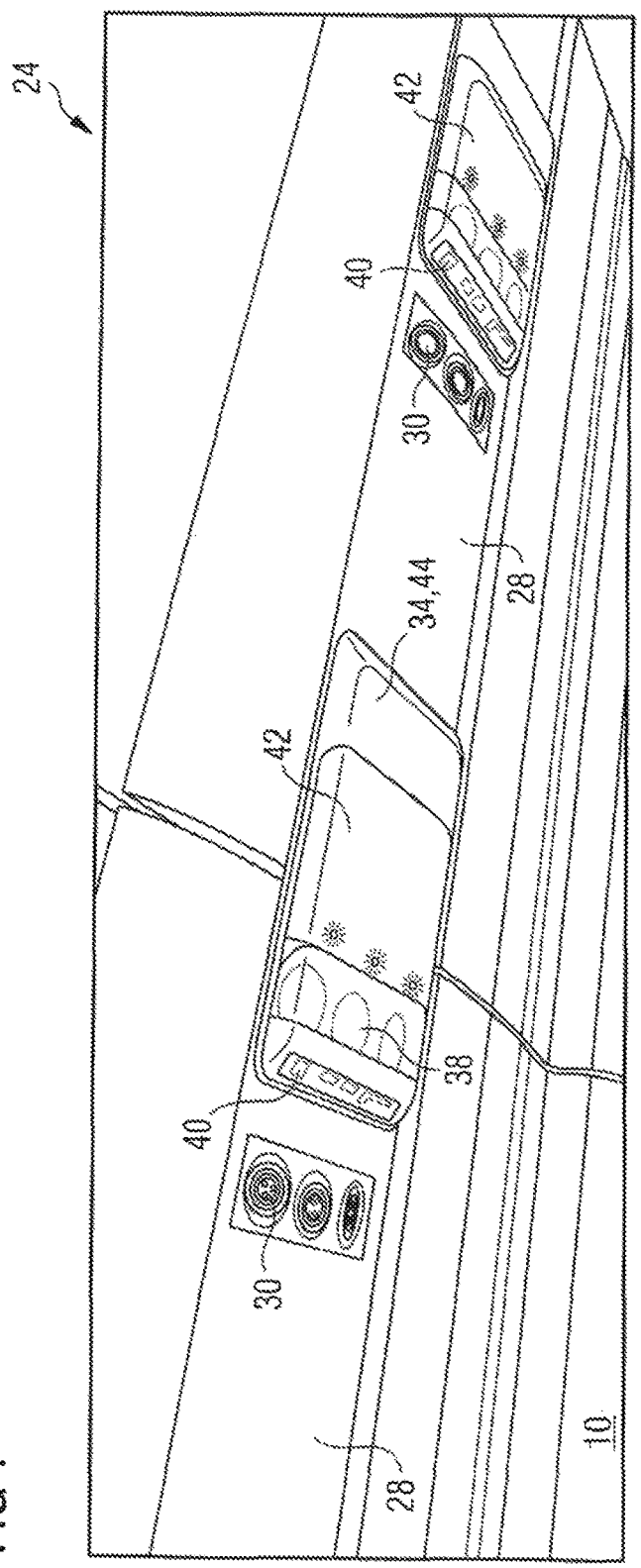

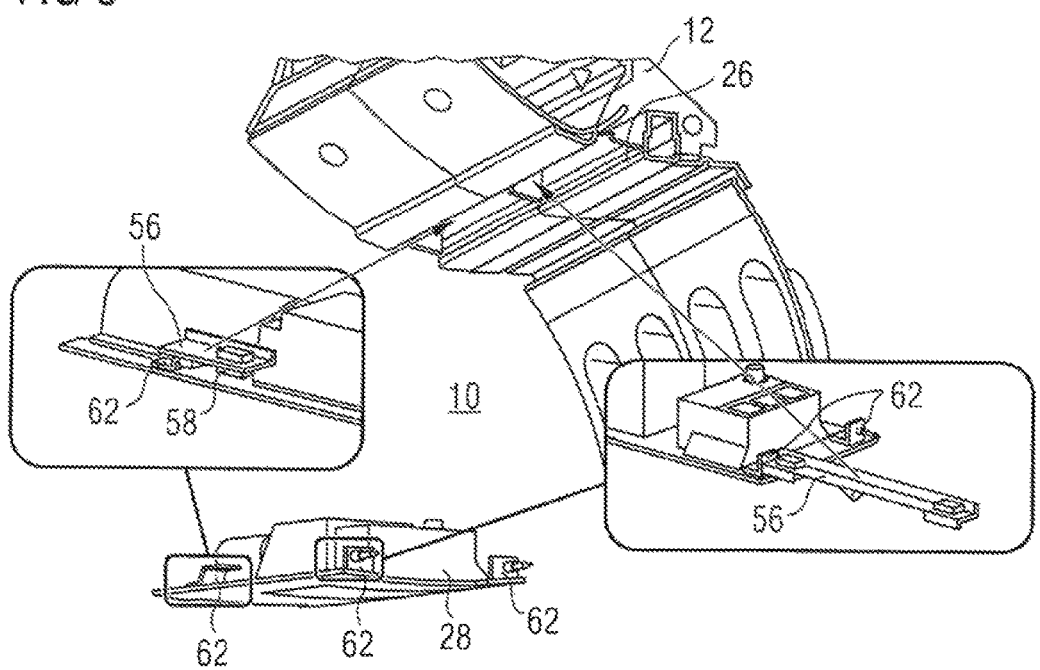

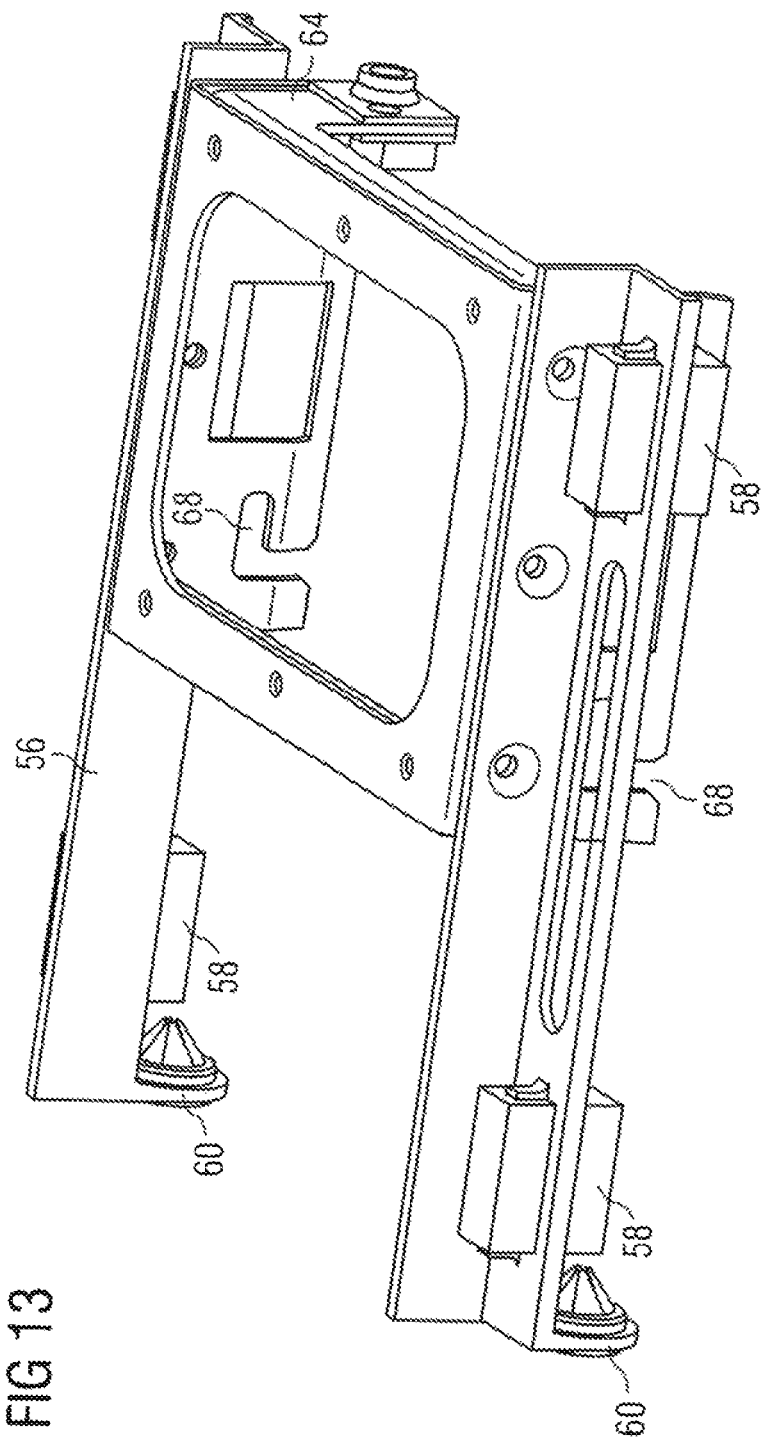

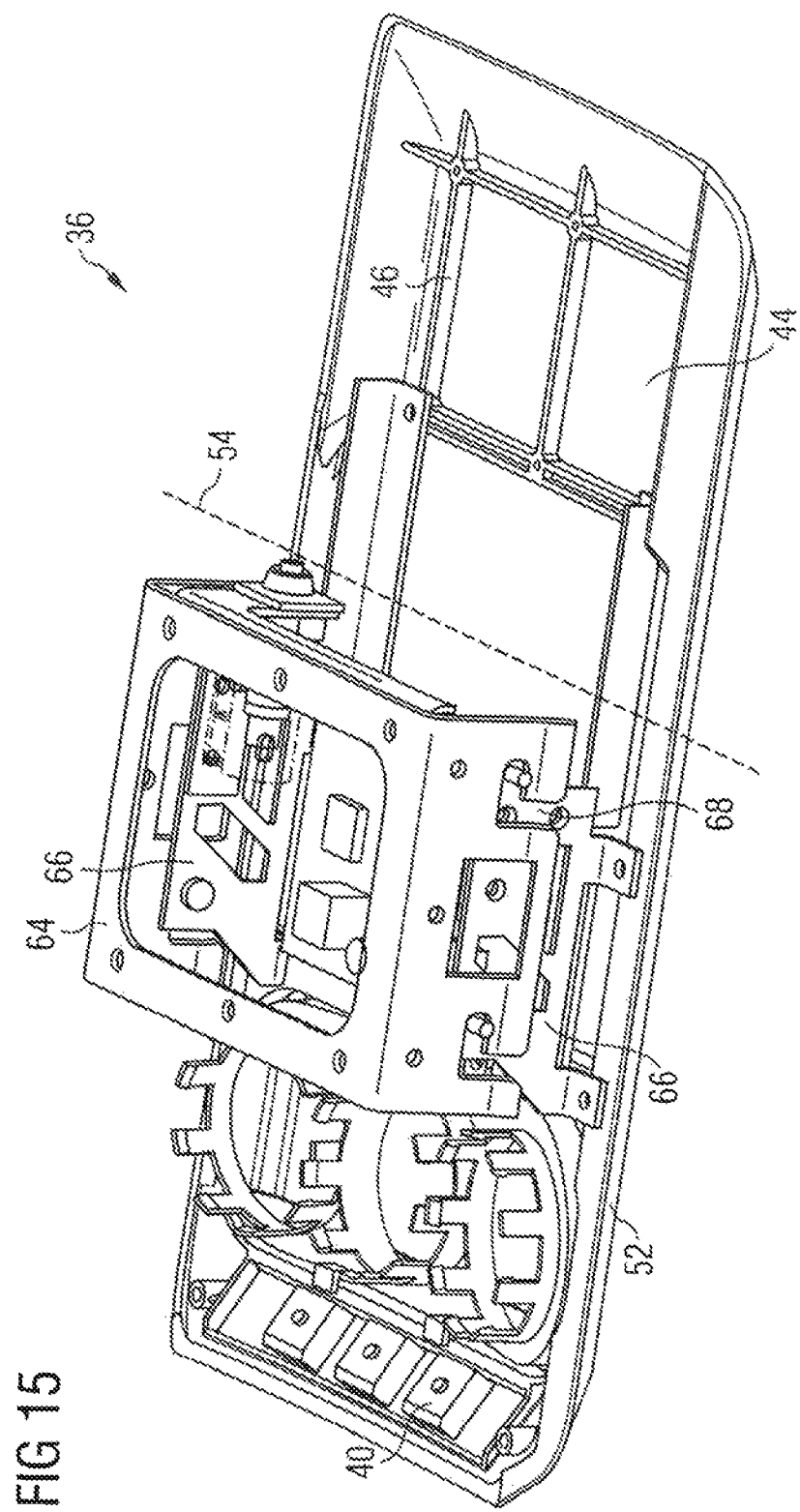

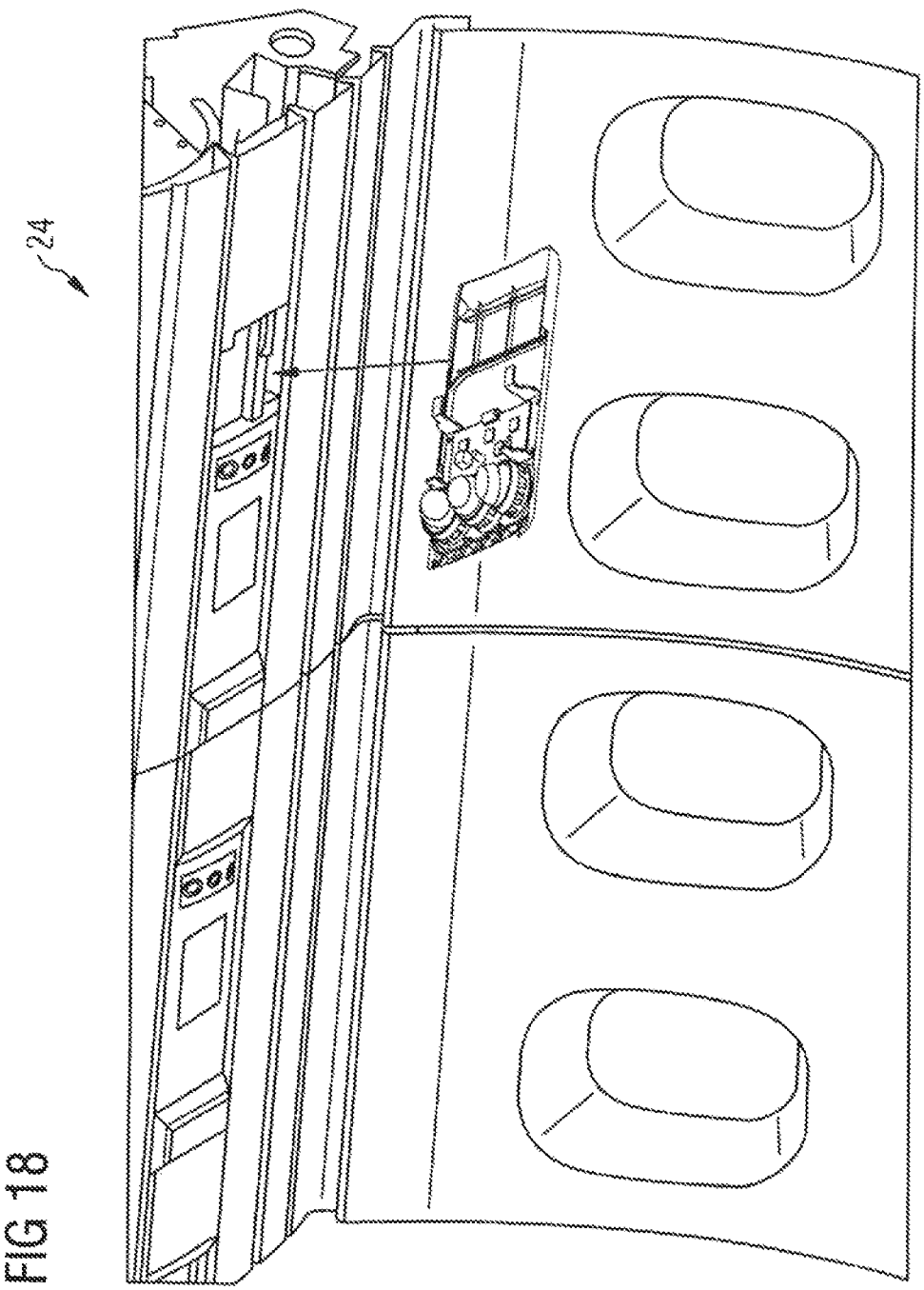

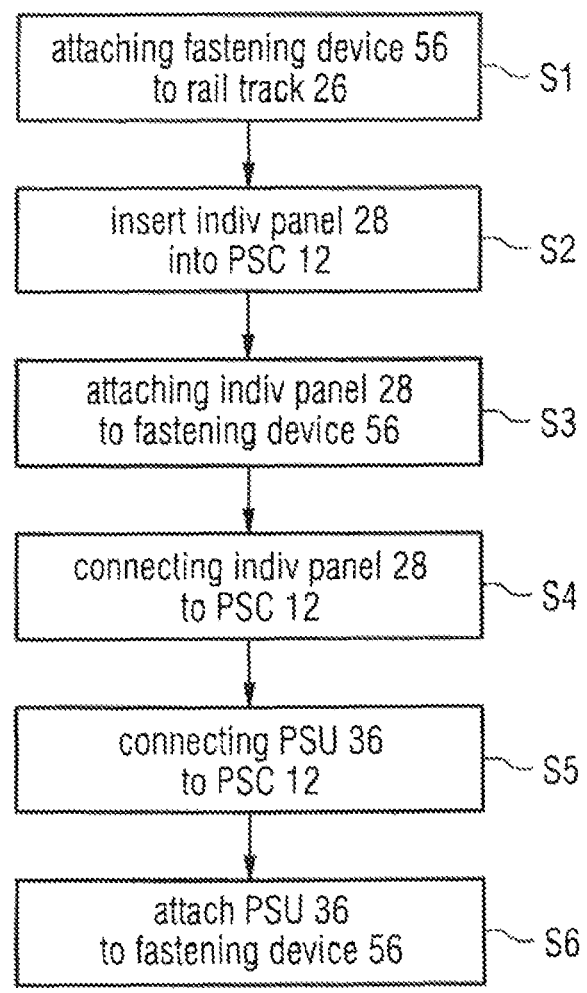

PASSENGER SUPPLY SYSTEM FOR INSTALLATION IN A PASSENGER SUPPLY CHANNEL

CROSS-REFERENCES TO RELATED APPLICATIONS

This application claims the benefit of the European patent application No. 13 166 672.9 filed on May 6, 2013, the entire disclosures of which are incorporated herein by way of reference.

BACKGROUND OF THE INVENTION

The present disclosure relates to a passenger supply system for installation in a passenger supply channel on board a vehicle, such as an aircraft. The present disclosure further relates to a cabin arrangement for installation on board a vehicle, such as an aircraft. Moreover, the present disclosure relates to a method for installing a passenger supply system in a passenger supply channel on board a vehicle, such as an aircraft. The present disclosure still further relates to a method for installing a cabin arrangement on board a vehicle, such as an aircraft.

The passenger cabin of a vehicle, such as an aircraft, a coach, a bus, a ship or the like, is conventionally equipped with a passenger supply channel (PSC). Such a PSC is described, for example, in DE 10 2009 058 849 corresponding to WO 2011/079906 or US 2012/312,921. The PSC is arranged in an aircraft cabin in an area below luggage compartments used to accommodate items of hand luggage of the passengers (hat racks).

Typically, in the area of the PSC a plurality of input components and/or output components are arranged. Such input/output components are described, for example, in DE 10 2012 018 569 corresponding to WO 2011/134615. The input/output components are connectable to the PSC for supplying passengers seated in the passenger seat row below the input/output components. The input/output components are arranged in a position that is accessible to the passenger(s) seated in the passenger seat row.

Input components allow the passengers to input orders or calls. To this end, the input component may be a touch panel, a monitor or one or more buttons, on which orders can be input, such as the call for a cabin crew member, the change of a sound volume or the change of a lamp lighting brightness.

Output components supply the passengers, for example, with light, visual information and/or sound information. To this end, the output component may be a loud speaker, a monitor, a display element, on which a fasten seatbelt sign, for example, is shown, and/or a lamp, such as a reading lamp. Additionally or alternatively, the output components supply the passengers with conditioned air, medical outlet and/or oxygen. To this end, the output component may be an air nozzle, a medical outlet module and/or an oxygen output module.

A typical air nozzle is individually adjustable for each passenger seat in the seat row. The air nozzle can be connected to an individual ventilation system, which is conventionally formed separately from a centrally controlled cabin ventilation system. In order to regulate the air flow supplied to the passenger cabin by way of the air nozzle, a passenger can adjust an air outlet cross-section of the air nozzle as desired, for example by rotation of a corresponding diaphragm element. An oxygen output module forms part of an emergency oxygen supply system that allows supplying each the passengers seated in the passenger seat row.

Conventionally, the input/output components are mounted on a rail track, which is configured to be mounted along the passenger supply channel. In particular, the input/output components are mounted side by side thus leaving a slit (or separating edge) between a first input/output component and a second input/output component adjacent (i.e., next neighboring) to the first input/output component. These slits are visible for the passengers.

Moreover, it may be desirable to change the distances between two adjacent seat rows, for example, when re-configuring from a high-density economy class configuration to an economy class configuration or from an economy class configuration to a premium economy class configuration or from a premium economy class configuration to a business or even first class configuration. Typical distance changes related with these configuration range between about 1 cm and 15 cm. In the case of such a re-configuration, every single input/output component has to be re-arranged as well such that after the re-configuration each passenger seat row is associated, for example, with the same a number of input/output components and such that the conditions for accessing the respective input/output components from the associated passenger seat row is identical or at least similar among all the passenger seat rows. The re-configuring of every single input/output component, however, is quiet complex and time-consuming. Furthermore: Due to the enlarging of the distance between two adjacent seat rows, it is mandatory to fill a gap between a first input/output component and a second input/output component neighbored next to the first input/output component by use of space filling panels. These space filling panels lead, in turn, to additional slits. Also, the space filling panels have to be mounted separately and additionally to the input/output components, what further complicates the re-configuration and increases the weight of the passenger supply system.

SUMMARY OF THE INVENTION

It is an object of the present invention to provide a passenger supply system for installation in a passenger supply channel on board a vehicle, such as an aircraft, a cabin arrangement for installation on board a vehicle, such as an aircraft, a method for installing a passenger supply system in a passenger supply channel on board a vehicle, such as an aircraft, and a method for installing a cabin arrangement on board a vehicle, such as an aircraft, which enable a simple, cost- and/or time-saving installation or re-configuration of the passenger supply system of improved functionality.

A passenger supply system for installation in a passenger supply channel (PSC) on board a vehicle, such as an aircraft, comprises a rail track. The rail track is mountable along the passenger supply channel, in particular, parallel to a longitudinal axis of the vehicle or aircraft. The passenger supply system further comprises a (so-called) indiv panel, which is mounted on the rail track and which is connectable to the passenger supply channel for supplying at least one passenger with conditioned air, medical outlet and/or oxygen. To this end, the indiv panel may further comprise at least one air nozzle, at least one medical outlet module and/or at least one oxygen output module mounted on the indiv panel. The indiv panel comprises at least one crossover area. The passenger supply system further comprises a (so-called) passenger supply unit (PSU), which is also mounted on the rail track and which is connectable to the passenger supply channel for supplying the at least one passenger with light, visual information and/or sound information. To this end, the PSU may comprise at least one lamp, at least one display element, at least one monitor, at least one loud speaker and/or at least one touch panel mounted on the PSU. The PSU comprises at least one overlapping area. The indiv panel and the PSU are configured such that in a mounted state of the indiv panel and of the PSU the overlapping area of the PSU at least partially overlaps with the crossover area of the indiv panel.

Such a passenger supply system has the following advantages: As the PSU has an overlapping area that overlaps with the crossover area of the indiv panel in their mounted states, at least a part of the indiv panel is hidden underneath the overlapping area of the PSU. This prevents a slit between the PSU and the indiv panel.

A further advantage of passenger supply system is the following: As the overlapping area of the PSU, which overlaps with the crossover area of the indiv panel, is of a specific extension, it is possible to even enlarge a distance between the PSU and the indiv panel without thereby generating a gap between the PSU and the indiv panel. Therefore, it is not mandatory to fill such gaps, for example, by additional space filling panels or the like. This enables a simple and cost- and time-saving installation or re-configuration of the passenger supply system.

In particular, the overlapping area of the PSU may be formed by a relatively thin blinding sheet, which can be made of a plastic, a light alloy, a compound material or the like or a combination thereof. For stiffening the overlapping area, the PSU may comprise a stiffening structure or laminar pattern attached to the blinding sheet. The overlapping area may extend from the PSU such that in the mounted state of the PSU the overlapping area is oriented substantially parallel to a passenger floor of the vehicle or aircraft. Similar, the crossover area of the indiv panel may be formed by a relatively thin blinding sheet, which can be made of a plastic, a light alloy, a compound material or the like or a combination thereof. For stiffening the crossover area, the indiv panel may comprise a stiffening structure or laminar pattern attached to the blinding sheet. The crossover area may extend from the indiv panel such that in the mounted state of the indiv panel the crossover area is oriented substantially parallel to a passenger floor of the vehicle or aircraft. In particular, the indiv panel and the PSU are configured such that in a mounted state of the indiv panel and of the PSU at least parts of the crossover area may be blinded from the view of passengers in the vehicle cabin because of being covered by the overlapping area of the PSU and/or such that in a mounted state of the indiv panel and of the PSU the overlapping area of the PSU substantially overlies flush at least partially on the crossover area of the indiv panel in a sandwich-like manner.

The indiv panel may further comprise an input/output area, through which at least one air nozzle mounted on the indiv panel, at least one medical outlet module mounted on the indiv panel and/or at least one oxygen output module mounted on the indiv panel is accessible to the passenger. In other words: Through the input/output area of the indiv panel the conditioned air of the air nozzle, the medical outlet of the medical outlet module and/or oxygen of oxygen output module can be supplied to the passenger seated in the below seat row. The input/output area of the indiv panel may comprise an opening hole. Additionally, the input/output area of the indiv panel may comprise a flap for closing the opening hole and for automatically opening the opening hole in case of an emergency. The input/output area of the indiv panel and the crossover area of the indiv panel may be separated from each other in a non-intersecting manner. This means, the indiv panel may be considered to be divided into the at least one crossover area of the indiv panel and, disjunctive therefrom, the input/output area of the indiv panel. This ensures that the input/output components mounted on the indiv panel are accessible to the passenger even if the overlapping area of the PSU completely overlaps with the crossover area of the indiv panel. The indiv panel may further comprise an air connection port for connecting an air nozzle of indiv panel to the passenger supply channel. The indiv panel may further comprise an electric connection port for connecting a medical outlet module and/or an oxygen output module of indiv panel to the passenger supply channel.

The PSU may further comprise an input/output area, through which at least one lamp mounted on the PSU, at least one display element mounted on the PSU, at least one monitor mounted on the PSU, at least one loud speaker mounted on the PSU and/or at least one touch panel mounted on the PSU is accessible to the passenger. In other words: Through the input/output area of the PSU the light, the visual information and/or the sound information can be supplied to the passenger seated in the below seat row. The input/output area of the PSU and the overlapping area of the PSU are separated from each other in a non-intersecting manner. This means, the PSU may be considered to be divided into the at least one overlapping area of the PSU and, disjunctive therefrom, the input/output area of the PSU. This ensures that the input/output components mounted on the PSU do not interfere an overlapping of the overlapping area of the PSU with the crossover area of the indiv panel. The PSU may further comprise an electric connection port for connecting a lamp, a display element, a monitor, a loud speaker and/or a touch panel of the PSU to the passenger supply channel.

The indiv panel may be configured such that the crossover area of the indiv panel extends in the mounted state of the indiv panel more than substantially 1 cm, preferably more than substantially 5 cm, more preferably more than substantially 15 cm along the passenger supply channel, parallel to the rail track and/or parallel to the passenger floor of the vehicle. Such an extension of the crossover area of the indiv panel allows that the indiv panel actually can be covered/blinded by the overlapping area of the PSU up to around 1 cm, 5 cm and 15 cm, respectively.

The PSU may be configured such that the overlapping area of the PSU extends in the mounted state of the PSU more than substantially 1 cm, preferably more than substantially 5 cm, more preferably more than substantially 15 cm along the passenger supply channel, parallel to the rail track and/or parallel to the passenger floor of the vehicle. Such an extension of the crossover area of the indiv panel allows distances of substantially 1 cm, substantially 5 cm and substantially 15 cm, respectively, between the indiv panel and the PSU, whereas still at least a part of the crossover area of the indiv panel is covered/blinded by the overlapping area of the PSU.

The passenger supply system may further comprise a fastening device. The fastening device may comprise an attaching device for attaching the fastening device to the rail track. The attaching device may be configured such that the fastening device can be temporarily rigidly, temporarily fixedly and/or temporarily slidably mounted on the rail track at any arbitrary position along the passenger supply channel.

The attaching device may be configured such that the fastening device can be switched from a state, in which the fastening device is rigidly or fixedly mounted on the rail track, to a state, in which the fastening device is slidably mounted on the rail track such that the fastening device can be slid along the rail track, or vice versa. This allows sliding the fastening device together with, for example, a PSU and/or an indiv panel attached to the fastening device as a whole along the passenger supply channel.

The indiv panel may comprise a complementary latching device. The fastening device may comprise a first latching device for cooperating with the complementary latching device of the indiv panel to attach the indiv panel to the fastening device. The first latching device and the complementary latching device of the indiv panel may be configured as a shift and snap-lock connection such that the complementary latching device of the indiv panel can be shifted along a path, which is predetermined by the first latching device, into the first latching device till snapping there in, wherefore the indiv panel is then rigidly or fixedly mounted on the fastening device. The first latching device and the complementary latching device of the indiv panel may be configured such that the cooperation between the first latching device and the complementary latching device of the indiv panel can be switched from a state, in which the indiv panel is rigidly or fixedly locked to the fastening device, to a state, in which the indiv panel is unlocked from the fastening device or in which the indiv panel is slidably mounted on the fastening device such that the indiv panel can be slid along a path predetermined by the fastening device, or vice versa.

The PSU may comprise a complementary latching device. The fastening device may comprise a second latching device for cooperating with the complementary latching device of the PSU to attach the PSU to the fastening device. The second latching device and the complementary latching device of the PSU may be configured as a shift and snap-lock connection such that the complementary latching device of the PSU can be shifted along a path, which is predetermined by the second latching device, into the second latching device till snapping there in, wherefore the PSU is then rigidly or fixedly mounted on the fastening device. The second latching device and the complementary latching device of the PSU may be configured such that the cooperation between the second latching device and the complementary latching device of the PSU can be switched from a state, in which the PSU is rigidly or fixedly locked/mounted to the fastening device, to a state, in which the PSU is unlocked from the fastening device or in which the PSU is slidably mounted on the fastening device such that the PSU can be slid along a path predetermined by the fastening device, or vice versa.

The first and second latching device may be mounted rigidly or fixedly on the fastening device such that the first and second latching devices are rigidly/fixedly positioned to each other. Such a fastening device allows mounting both a PSU and an indiv panel to one fastening device. Therefore, the PSU and the indiv panel attached to the fastening device form a common unit together with the fastening device. In this sense, the unit comprising the PSU, the indiv panel and the fastening device may be realized as a single module containing three components (namely fastening device, indiv panel and PSU) for installation in the PSC. This simplifies the installation and the costs and reduces the weight of the passenger supply system. Additionally, it is possible that the distance between a fastening device and a neighboring fastening device and the distance between an indiv panel and a neighboring indiv panel and the distance between a PSU and a neighboring PSU can be changed simultaneously. This simplifies a re-configuration when changing between two class configurations.

A cabin arrangement for installation on board a vehicle, such as an aircraft, comprises a passenger supply system as described above and a passenger supply channel (PSC). The PSC is mountable in the vehicle along a longitudinal axis of the vehicle. The longitudinal axis may correspond to the ordinary moving direction of the vehicle. The PSC may comprise a lining panel. The lining panel may define a channel opening of the PSC, in particular by the rims of the lining panel. The channel opening may be formed as an elongated slot of or within the PSC.

The indiv panel, the PSU and the lining panel may be configured such that in a mounted state of the indiv panel, of the PSU and of the lining panel an extension of the channel opening along a direction perpendicular to the longitudinal axis of the vehicle is smaller than both an extension of the indiv panel and an extension of the PSU along the same direction. As a result of the bigger extension of the indiv panel in comparison to the extension of the channel opening, the indiv panel may be intrinsically held by the lining panel, for example, when the indiv panel is inserted into the PSC such that the indiv panel lies on the lining panel rims defining the channel opening on a side of the lining panel, which faces away from the cabin. This enables not only that the indiv panel is supported (i.e., carried) by the lining panel allowing a stable construction. It also enables that a "slit" (or contact line) between the indiv panel and the lining panel is oriented out of the line of sight of a passenger inside the cabin, who looks towards the cabin arrangement. Therefore, the "slit"/contact line is hidden from the passenger's view and is thus not recognizable.

Similar applies for a slit between the PSU and lining panel: Because of the bigger extension of the PSU in comparison to the extension of the channel opening, the PSU may cover/hide at least the lining panel rims defining the channel opening on a side of the lining panel, which faces towards the cabin. This enables that the slit between the PSU and the lining panel is also oriented out of the line of sight of a passenger inside the cabin, who looks towards the cabin arrangement, and is thus hidden from the passenger's view. However, the slit between the PSU and the lining panel still allows insertion of, for example, a tool at a specific position to switch the attaching device of the fastening device and/or to switch the cooperation between the first latching device and the complementary latching device of the indiv panel and/or to switch the cooperation between the second latching device and the complementary latching device of the PSU from, e.g., a lock state to an unlock state.

The indiv panel, the PSU and the lining panel defining the channel opening may further be configured such that in a mounted state of the indiv panel, of the PSU and of the lining panel the lining panel is at least partially sandwiched between the indiv panel and the PSU. For example, the indiv panel and the lining panel may be configured such that in the mounted state outer rims of the indiv panel lie flush on outer lining panel rims that define the channel opening. The PSU and the lining panel may be configured such that in the mounted state a side of outer rims of the PSU facing towards the lining panel is oriented approximately parallel to a side of the outer lining panel rims facing towards the PSU. As a result of the sandwiched structure, a "three layer" arrangement can be realized, in which are stacked (at least locally) the indiv panel on the top, the lining panel in the middle and the PSU at the bottom.

A method for installing a passenger supply system in a passenger supply channel (PSC) on board a vehicle, such as an aircraft, comprises the steps:

a) mounting a rail track along the PSC, b) mounting an indiv panel on the rail track, c) connecting the indiv panel to the PSC for supplying at least one passenger with conditioned air, medical outlet and/or oxygen, d) connecting a passenger supply unit (PSU) to the PSC for supplying the at least one passenger with light, visual information and/or sound information, e) mounting the PSU on the rail track such that in the mounted state of the PSU and of the indiv panel an overlapping area of the PSU at least partially overlaps with a crossover area of the indiv panel. By this method it can be realized that in the mounted state of the indiv panel and of the PSU at least parts of the crossover area are covered/blinded from the view of passengers in the vehicle cabin because of being covered/blinded by the overlapping area of the PSU.

Additionally or alternatively, the method for installing a passenger supply system in a PSC on board a vehicle, such as an aircraft, may comprise the steps:

a') mounting a rail track along the PSC, b') mounting all indiv panels of the passenger supply system on the rail track, c') connecting all the indiv panels to the PSC for supplying at least one passenger with conditioned air, medical outlet and/or oxygen, d') connecting all passenger supply units (PSUs) to the PSC for supplying the at least one passenger with light, visual information and/or sound information, e') mounting all the PSUs on the rail track such that in the mounted state of the PSUs and of the indiv panels an overlapping area of a PSU at least partially overlaps with a crossover area of an indiv panel directly neighboring to the PSU.

The method may further comprise the step:

f) mounting at least one air nozzle, at least one medical outlet module and/or at least one oxygen output module on the indiv panel such that through an input/output area of the indiv panel the air nozzle, the medical outlet module and/or the oxygen output module is accessible to the passenger and such that the input/output area of the indiv panel and the crossover area of the indiv panel are separated from each other in a non-intersecting manner. This allows that the input/output components mounted on the indiv panel are accessible to the passenger even if the overlapping area of the PSU completely overlaps with the crossover area of the indiv panel.

The method may further comprise the step:

g) mounting at least one lamp, at least one display element, at least one button, at least one touch panel, at least one loud speaker and/or at least one monitor on the PSU such that through an input/output area of the PSU the lamp, the display element, the monitor, the loud speaker and/or the touch panel is accessible to the passenger and such that the input/output area of the PSU and the overlapping area of the PSU are separated from each other in a non-intersecting manner. This allows that the input/output components mounted on the PSU do not interfere an overlapping of the overlapping area of the PSU with the crossover area of the indiv panel.

The method may further comprise the step:

h) mounting the indiv panel such that the crossover area of the indiv panel extends in the mounted state of the indiv panel more than substantially 1 cm, preferably more than substantially 5 cm, more preferably more than substantially 15 cm along the passenger supply channel. This allows that the indiv panel actually can be covered/blinded by the overlapping area of the PSU up to around 1 cm, 5 cm and 15 cm, respectively.

The method may further comprise the step:

i) mounting the passenger supply unit such that the overlapping area of the passenger supply unit extends in the mounted state of the passenger supply unit more than substantially 1 cm, preferably more than substantially 5 cm, more preferably more than substantially 15 cm along the passenger supply channel. This allows distances of substantially 1 cm, substantially 5 cm and substantially 15 cm, respectively, between the indiv panel and the PSU, whereas still at least a part of the crossover area of the indiv panel is covered/blinded by the overlapping area of the PSU.

The method may further comprise the steps:

j) attaching a fastening device to the rail track by use of an attaching device of fastening device, k) attaching the indiv panel to the fastening device by cooperation of a first latching device of the fastening device with a complementary latching device of the indiv panel, and l) attaching the passenger supply unit to the fastening device by cooperation of a second latching device of the fastening device with a complementary latching device of the passenger supply unit.

The sequence of the above method steps may be: a), then b), then c), then d), then e). Or: a'), then b'), then c'), then d'), then e'). This sequence allows that the indiv panels can be easily connected to the PSC after having mounted the indiv panels on the rail track as the PSUs are not yet mounted on the rail track and thus gaps between the indiv panels exist, through which the installer can connect the indiv panels.

In particular, method step f) may be performed before method step b). Method step g) may be performed before method step d).

A method for installing a cabin arrangement on board a vehicle, such as an aircraft, comprises the steps:

m) providing a passenger supply system as described above, n) mounting a PSC in the vehicle along a longitudinal axis of the vehicle such that a lining panel of the PSC defines a channel opening of the PSC, and o) mounting the indiv panel, the passenger supply unit and the lining panel such that an extension of the channel opening along a direction perpendicular to the longitudinal axis is smaller than both an extension of the indiv panel and an extension of the passenger supply unit along the same direction.

The method for installing a cabin arrangement may further comprise the step:

p) mounting the indiv panel, the PSU and the lining panel defining the channel opening such that the lining panel is at least partially sandwiched between the indiv panel and the passenger supply unit.

When mounting the indiv panel, the indiv panel may first be inserted in a tilted orientation through the channel opening of the PSC, then be tilted back and finally be laid on the lining panel rims defining the channel opening on a side of the lining panel, which faces away from the cabin. For example, the indiv panel and the lining panel may be mounted such that outer rims of the indiv panel lie flush on outer lining panel rims that define the channel opening. The PSU may be mounted such that a side of outer rims of the PSU facing towards the lining panel is oriented approximately parallel to a side of the outer lining panel rims facing towards the PSU.

One of the above described passenger supply systems may be used in a passenger supply channel on board a vehicle, such as an aircraft. One of the above described cabin arrangement may be used on board a vehicle, such as an aircraft. One of the above described methods may be used to install a passenger supply system in a passenger supply channel on board a vehicle, such as an aircraft. One of the above described methods may be used to install a cabin arrangement on board a vehicle, such as an aircraft.

An aircraft may comprise a passenger supply channel and one of the above described passenger supply systems.

BRIEF DESCRIPTION OF THE DRAWINGS

Further features, advantages and technical effects of the invention will become apparent from the following description of exemplary embodiments with reference to the accompanying drawings, in which:

FIG. 2 schematically illustrates an exploded view of a passenger supply system for installation in a passenger supply channel (PSC) on board an aircraft, FIGS. 3A, 3B schematically illustrate an indiv panel, FIG. 4 schematically illustrates a passenger supply unit (PSU), FIG. 5A to 8B schematically illustrate an indiv panel and a PSU in a mounted state, FIG. 9 schematically illustrates a fastening device and an indiv panel, FIG. 10 schematically illustrates an indiv panel and a PSU mounted in a PSC, FIG. 11 schematically illustrates a PSU, FIG. 12 schematically illustrates a complementary latching device of a PSU, FIG. 13 schematically illustrates a fastening device and a second latching device, FIG. 14A, 14B schematically illustrate a second latching device of a fastening device, FIG. 15 schematically illustrates a second latching device of a fastening device and a complementary latching device mounted on a PSU, FIG. 16 schematically illustrates a PSU mounted on a rail track, FIG. 17A, 17B schematically illustrate the mounting of indiv panels, FIG. 18 schematically illustrates the mounting of PSUs, and FIG. 19 schematically illustrates a PSU having a monitor.

FIG. 20 schematically illustrates a method for installing a cabin arrangement on board an aircraft.

DETAILED DESCRIPTION OF THE PREFERRED EMBODIMENTS

Figure 1:
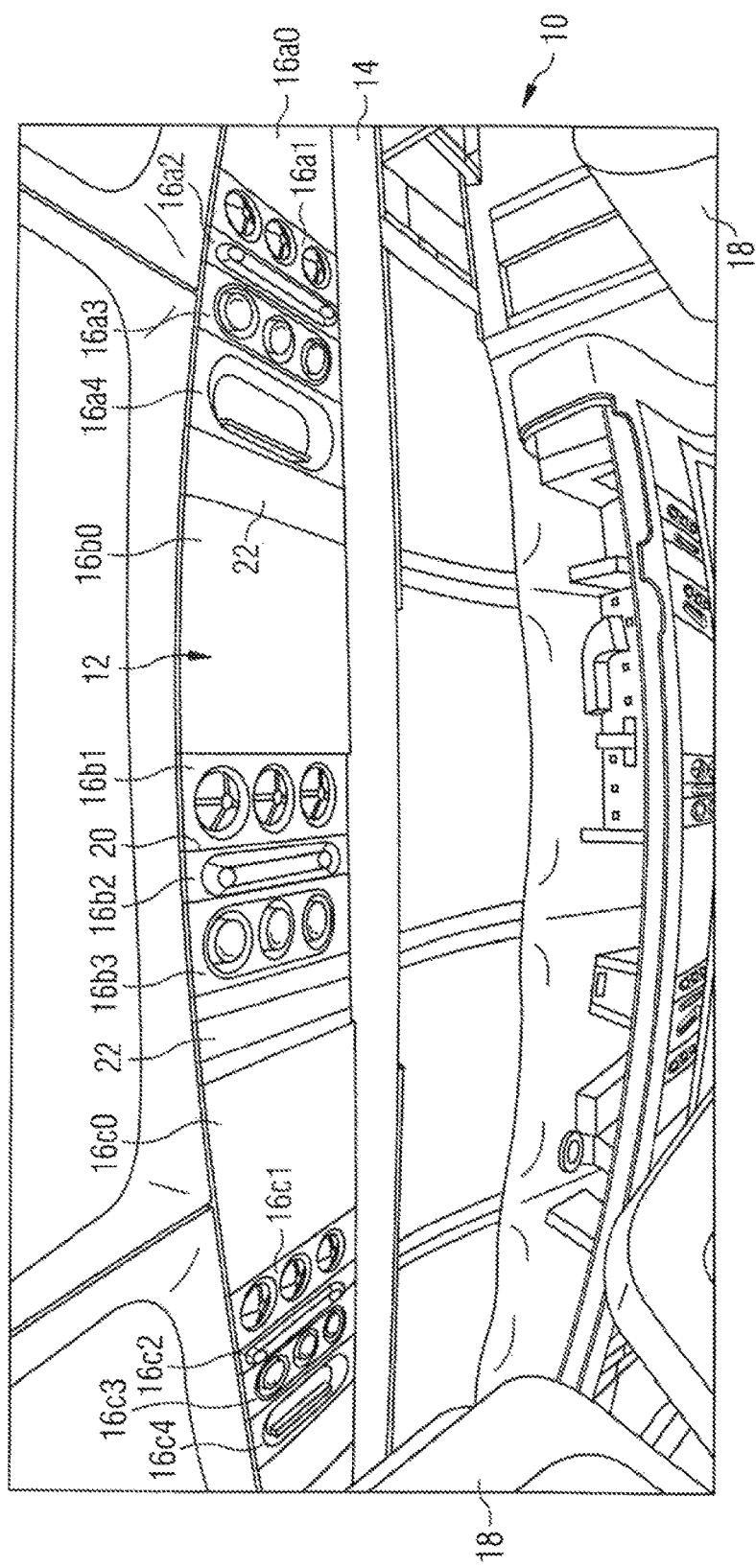
FIG. 1 schematically illustrates a passenger cabin of an aircraft (prior art)

FIG. 1 shows the passenger cabin 10 of an aircraft. The cabin 10 is equipped with a passenger supply channel (PSC) 12. The PSC 12 is arranged in the cabin 10 in an area below luggage compartments 14 used to accommodate items of hand luggage of the passengers (hat racks).

In the area of the PSC 12 are arranged a plurality of input/output components 16 connected to the PSC 12 for supplying passengers seated in the passenger seat row 18 below the input/output components 16. For each seat row 18 exemplarily three or four input/output components 16a1, 16a2, 16a3, 16a4, 16b1, 16b2, 16b3, 16c1, 16c2, 16c3, 1.6c4 are arranged in a position that is accessible to the passenger seated in the seat row 18.

Input components 16a2, 16b2, 16c2 allow the passengers to input orders or calls. To this end, the input components 16a2, 16b2, 16c2 comprise, for example, buttons, on which the orders can be input.

Output components 16a3, 16a4, 16b3, 16c3, 16c4 supply the passengers with light and visual information. To this end, the output components 16a3, 16b3, 16c3 comprise, for example, reading lamps. The output components 16a4, 16c4 are display elements, on which a fasten seatbelt sign, for example, is shown. The output components 16a1, 16b1, 16c1 comprise air nozzles to supply the passengers with conditioned air. The output components 16a0, 16b0, 16c0 comprise (hidden) oxygen output modules to supply the passengers with oxygen in case of an emergency.

Conventionally, as shown in FIG. 1, the input/output components 16 are mounted along the PSC 12 side by side thus leaving a slit (or separating edge) between a first input/output component and a second input/output component adjacent (i.e., next neighboring) to the first input/output component. Exemplarily, a single slit is indicated by 20 in FIG. 1. The slit 20 opens up a straight path from the cabin 10 into the interior of the PSC 12. These slits 20 are visible for the passengers.

Moreover, as it is desirable to change the distances between two adjacent seat rows 18 when re-configuring from an economy class configuration to a business or even a first class configuration, every single input/output component 16 has to be re-arranged. The re-configuring of every single input/output component 18, however, is quiet time-consuming. Furthermore: Due to the enlarging of the distance between two adjacent seat rows 18, it is mandatory to fill a gap between a first input/output component 16a4, 16b3 and a second input/output component 16b0, 16c0 neighbored next to the first input/output component 16a4, 16b3 by use of space filling panels 22. These space filling panels 22 lead, in turn, to additional slits 20. Also, the space filling panels 22 have to be mounted separately to the input/output components 16, what further complicates the re-configuration and increases the weight of the passenger supply system.

An inventive passenger supply system 24 for installation in a PSC 12 in the cabin 10 of an aircraft is shown in FIG. 2. The passenger supply system 24 comprises a rail track 26 exemplarily formed of two parallel U-profiles. The rail track 26 is mountable along the PSC 12 parallel to a longitudinal axis x of the aircraft.

Figure 3A:
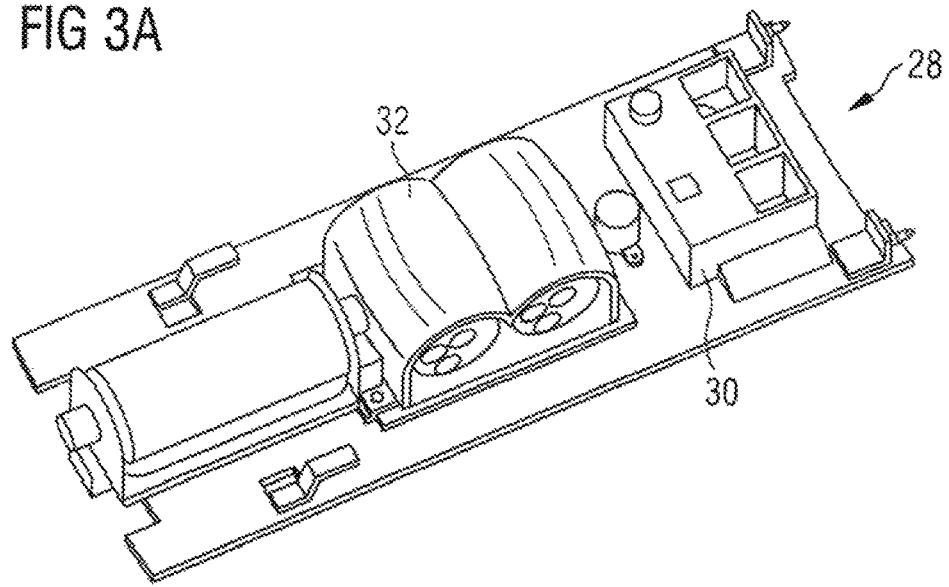
Figure 3B:
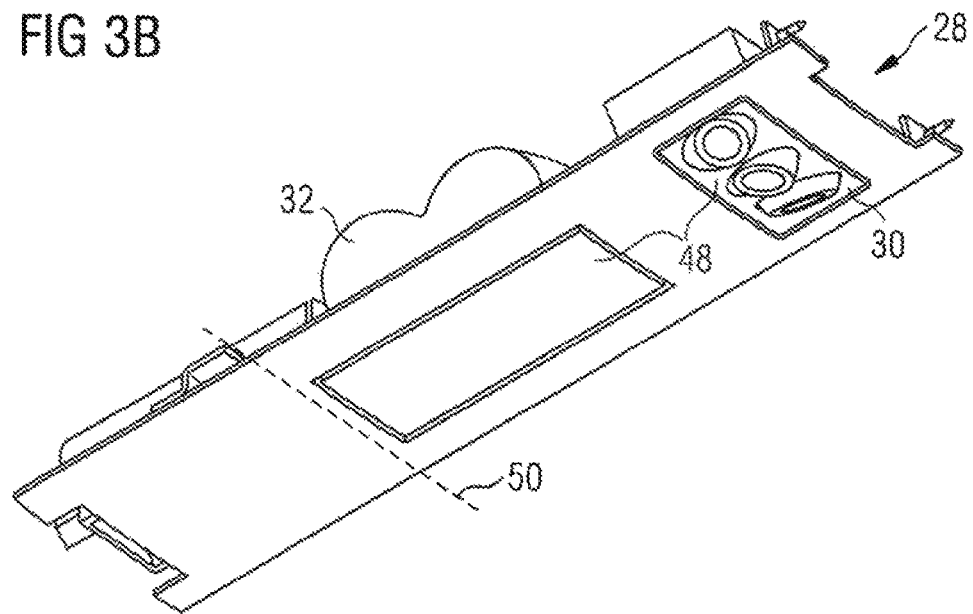

The passenger supply system 24 further comprises a (so-called) indiv panel 28, which is connectable to the PSC 12 for supplying at least one passenger with conditioned air, medical outlet and/or oxygen. In FIG. 2 two different examples of an indiv panel 28a, 28b are shown. Indiv panel 28a comprises three air nozzles 30 and an oxygen output module 32. Indiv panel 28b only comprises three air nozzles 30, but no oxygen output module. The indiv panel 28 comprises a crossover area 34. A close-up of the indiv panel 28b is shown in FIG. 3A (as seen from the PSC 12) and 3B (as seen from the cabin 10).

The passenger supply system 24 further comprises a (so-called) passenger supply unit (PSU) 36, which is connectable to PSC 12 for supplying the at least one passenger with light, visual information and/or sound information. The PSU 36 comprises exemplarily three reading lamps 38, a display element 40, on which a fasten seatbelt sign, for example, is shown, and a touch panel 42. The PSU 36 further comprises an overlapping area 44. A close-up of the indiv panel 28b is shown in FIG. 4 (as seen from the PSC 12).

As shown in FIGS. 5A, 5B (side views), 6 (as seen from the PSC 12), and 7, 8A, 8B (as seen from the cabin 10), the indiv panel 28 and the PSU 36 are configured such that in a mounted state of the indiv panel 28 and of the PSU 36 the overlapping area 44 of the PSU 36 at least partially overlaps with the crossover area 34 of the indiv panel 28. In particular, the indiv panel 28 and the PSU 36 are configured such that in a mounted state of the indiv panel 28 and of the PSU 36 at least parts of the crossover area 34 is blinded from the view of passengers in the cabin 10 by being covered by the overlapping area 44 of the PSU 36 and such that the overlapping area 44 of the PSU 36 substantially overlies flush on the crossover area 34 of the indiv panel 28, as shown e.g., in FIGS. 5A and 5B.

As the PSU 36 has an overlapping area 44 that overlaps with the crossover area 34 of the indiv panel 28 in a mounted state of the indiv panel 28 and of the PSU 36, at least a part of the indiv panel 28 is hidden underneath the overlapping area 44 of the PSU 36. This prevents a slit (as indicated with 20 in FIG. 1) between the PSU 36 and the indiv panel 28, see FIGS. 5A to 8B.

Further, as the overlapping area 44 of the PSU 36, which overlaps with the crossover area 34 of the indiv panel 28, is of a specific extension, it is possible that a distance D between the PSU 36 and the indiv panel 28 may be configured variable without leading to gap between the PSU 36 and the indiv panel 28, see FIGS. 5A, 5B, 8A and 8B. Therefore, it is not mandatory to fill such a gap, for example, by additional space filling panels (as indicated with 22 in FIG. 1).

Exemplarily, as shown e.g., in FIGS. 5A and 5B, the overlapping area 44 of the PSU 36 is formed by a relatively thin blinding sheet, which can be made of a plastic, a light alloy, a compound material or the like or a combination thereof. As shown e.g., in FIGS. 2 and 4, for stiffening the overlapping area 44, the PSU 36 comprises a stiffening structure 46 attached to the blinding sheet. Similarly, as shown e.g., in FIG. 2, the crossover area 34 of the indiv panel 28 is formed by a relatively thin blinding sheet, which can be made of a plastic, a light alloy, a compound material or the like or a combination thereof.

Figure 8A:
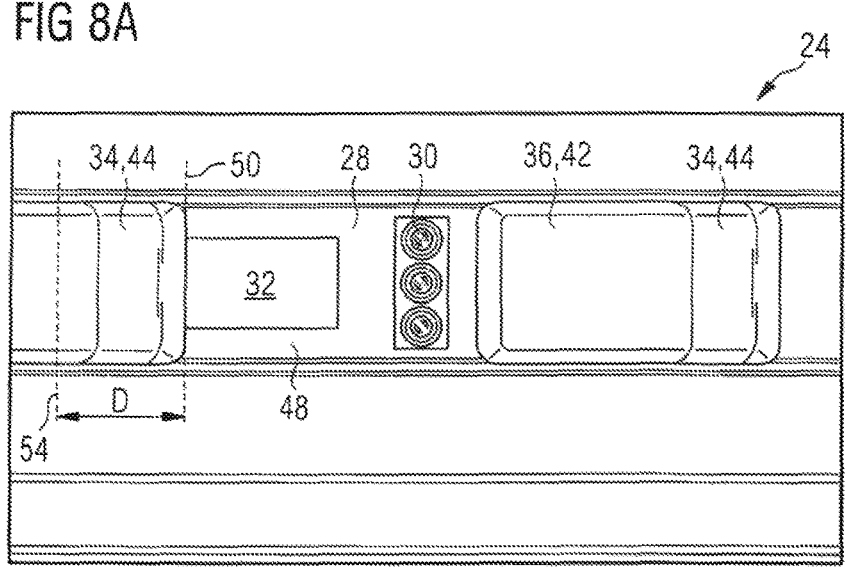
Figure 8B:
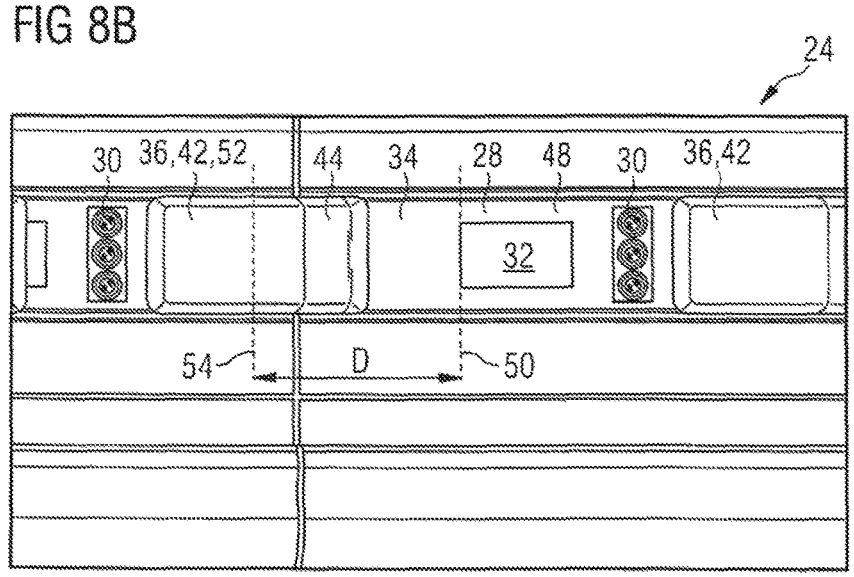

As shown e.g., in FIGS. 2, 8A and 8B, the indiv panel 28 comprises an input/output area 48 formed as an opening hole 48, through which the air nozzles 30 and the oxygen output module 32 are accessible to the passenger, i.e., through the input/output area 48 of the indiv panel 28 the conditioned air of the air nozzles 30 and the oxygen of oxygen output module (via oxygen masks) can be supplied to the passenger seated in the seat row 18 below. The input/output area 48 of the indiv panel 28 comprises a flap 32 for closing the opening hole 48 and for automatically opening the opening hole 48 in case of an emergency.

The input/output area 48 of the indiv panel 28 and the crossover area 34 of the indiv panel 28 are separated from each other in a non-intersecting manner, i.e., the indiv panel 28 is considered to be divided into the at least one crossover area 34 and, disjunctive therefrom, the input/output area 44 of the indiv panel 28. The disjunctive separation of the crossover area 34 and the input/output area 48 of the indiv panel 28 is indicated by the dashed line 50. This ensures that the input/output components 30, 32 mounted on the indiv panel 28 are accessible to the passenger even if the overlapping area 44 of the PSU 36 completely overlaps with the crossover area 34 of the indiv panel 28, as shown in FIGS. 5B and 8A.

The PSU 36 comprises an input/output area 52, through which the lamps 38, the display element 40 and the touch panel 42 of the PSU 36 are accessible to the passenger, i.e., through the input/output area 52 of the PSU 36 the light, the visual information and/or the sound information can be supplied to the passenger seated in the seat row 18 below. The input/output area 52 of the PSU 36 and the overlapping area 44 of the PSU 36 are separated from each other in a non-intersecting manner, i.e., the PSU 36 is considered to be divided into the at least one overlapping area 44 and, disjunctive therefrom, the input/output area 52 of the PSU 36. The disjunctive separation of the overlapping area 44 and the input/output area 52 of the PSU 36 is indicated by the dashed line 54. This ensures that the input/output components 38, 40, 42 mounted on the PSU 36 do not interfere an overlapping of the overlapping area 44 of the PSU 36 with the crossover area 34 of the indiv panel 28.

Exemplarily, the indiv panel 28 is configured such that the crossover area 34 extends in the mounted state of the indiv panel 28 substantially 15 cm (which corresponds roughly to 6 inches) along the PSC 12 parallel to the rail track 26. Such an extension of the crossover area 34 allows that the indiv panel 28 actually can covered/blinded by the overlapping area 44 of the PSU 36 up to about 15 cm.

Similarly, the PSU 36 is configured such that the overlapping area 44 extends in the mounted state of the PSU 36 more than substantially 15 cm (which also corresponds roughly to 6 inches) along the PSC 12 parallel to the rail track 26. Such an extension of the crossover area 44 allows distances D of up to around 15 cm between the indiv panel 28 and the PSU 26, whereas still at least a part of the crossover area 34 of the indiv panel 28 is blinded by the overlapping area 42 of the PSU 36.

As shown in FIG. 2, the passenger supply system 24 further comprises a fastening device 56, which includes an attaching device 58 for attaching the fastening device 56 to the rail track 26. The attaching device 58 may be configured such that the fastening device 56 can be temporarily rigidly, temporarily fixedly and/or temporarily slidably mounted on the rail track at any arbitrary position along the PSC 12 and the rail track 26, respectively. In particular, the attaching device 58 is configured such that the fastening device 56 can be switched from a state, in which the fastening device 56 is rigidly or fixedly mounted on the rail track 26, to a state, in which the fastening device 56 is slidably mounted on the rail track 26 such that the fastening device 56 can be slid along the rail track 26. This allows sliding the fastening device 56 together with the PSU 36 and the indiv panel 28 attached to the fastening device 56 as a whole along the PSC 12.

As shown in FIGS. 2 and 9, the indiv panel 28 comprises a complementary latching device 62. The fastening device 56 further comprises a first latching device 60 for cooperating with the complementary latching device 62 of the indiv panel 28 to attach the indiv panel 28 to the fastening device 56. The first latching device 60 and the complementary latching device 62 are configured as a combination of shift and snap-lock connection such that the complementary latching device 62 of the indiv panel 28 can be shifted along a path, which is predetermined by the first latching device 60, into the first latching device 60 till snapping there in, wherefore the indiv panel 28 is then rigidly or fixedly mounted on the fastening device 56. In particular, the first latching device 60 and the complementary latching device 62 are configured such that the cooperation between the first latching device 60 and the complementary latching device 62 can be switched from a state, in which the indiv panel 28 is rigidly or fixedly locked to the fastening device 56, to a state, in which the indiv panel 28 is unlocked from the fastening device 56 and in which the indiv panel 28 is slidably mounted on the fastening device 56 such that the indiv panel 28 can be slid along a path predetermined by the fastening device 56.

Additionally, as shown in FIG. 2, and 10 to 16, the fastening device 56 comprises a second latching device 64 for cooperating with a complementary latching device 66 of the PSU 36 to attach the PSU 36 to the fastening device 56. The second latching device 64 and the complementary latching device 66 are configured as a shift and snap-lock connection such that the complementary latching device 66 can be shifted along a path 68, which is predetermined by the second latching device 64, into the second latching device 64 till snapping there in, wherefore the PSU 36 is then rigidly or fixedly mounted on the fastening device 56, see FIGS. 15 and 16. In particular, the second latching device 64 and the complementary latching device 66 are configured such that the cooperation between the second latching device 64 and the complementary latching device 66 can be switched from a state, in which the PSU 36 is rigidly or fixedly locked/mounted to the fastening device 56, to a state, in which the PSU 36 is unlocked from the fastening device 56 and in which the PSU 36 is slidably mounted on the fastening device 56 such that the PSU 36 can be slid along a path 68 predetermined by the fastening device 56.

The fastening device 56 allows mounting both a PSU 36 and an indiv panel 28 to one fastening device 56, see FIG. 2. This simplifies the installation and the weight of the passenger supply system 24, but still enables to adjust the distance D between an indiv panel 28 and a directly neighboring PSU 36, namely the indiv panel 28 attached to the first latching device 60 of a first fastening device 56 and the PSU 36 attached to the second latching device 64 of a second fastening device 56 different from the first fastening device 56, compare FIGS. 2, 5A, 5B, 8A and 8B.

Figure 11:
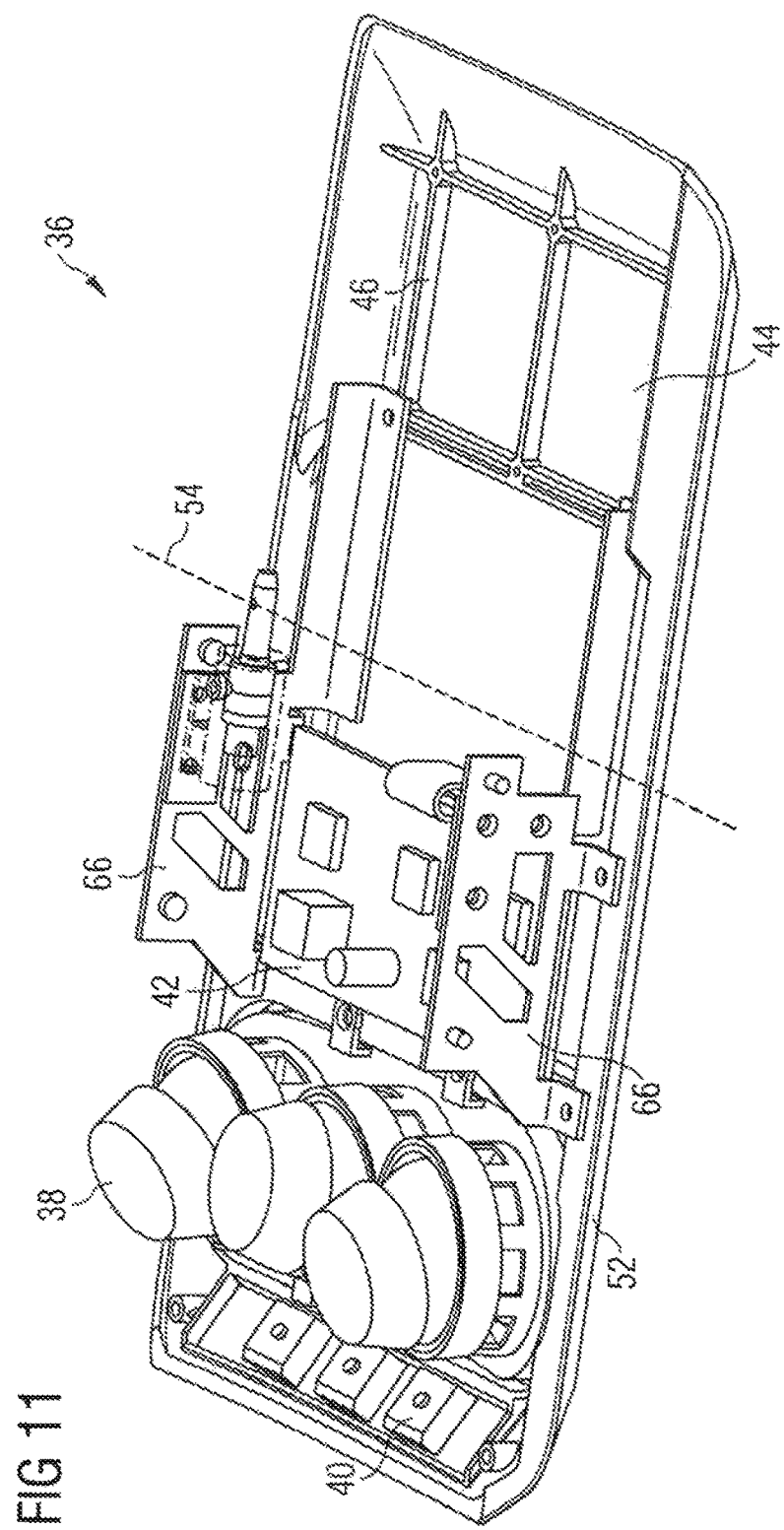
Figure 12:
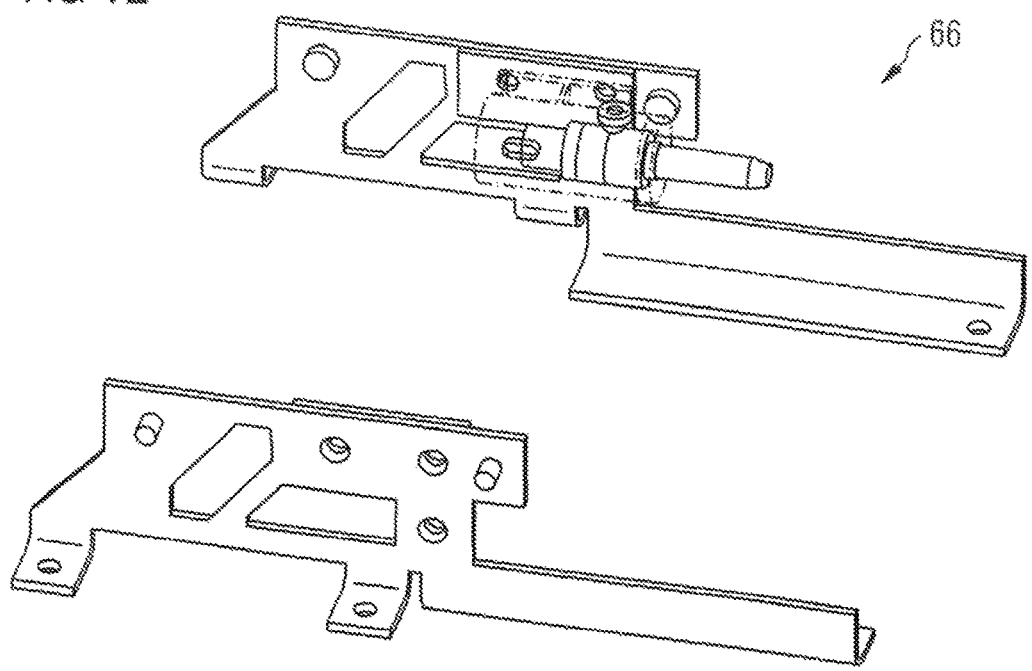
Figure 14A:
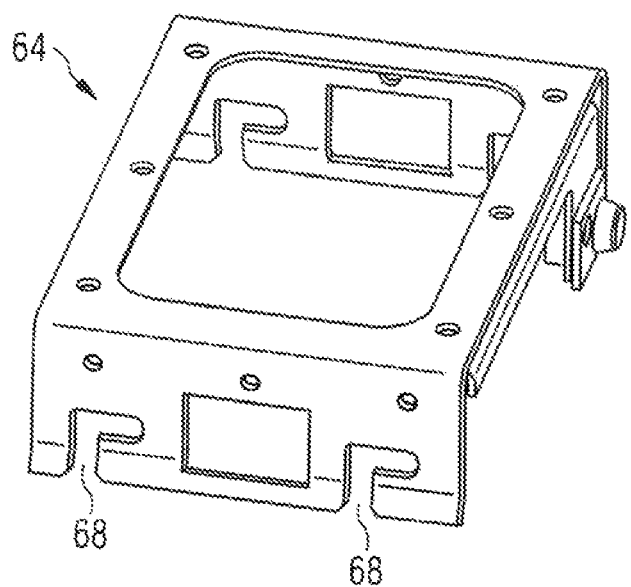
Figure 14B:
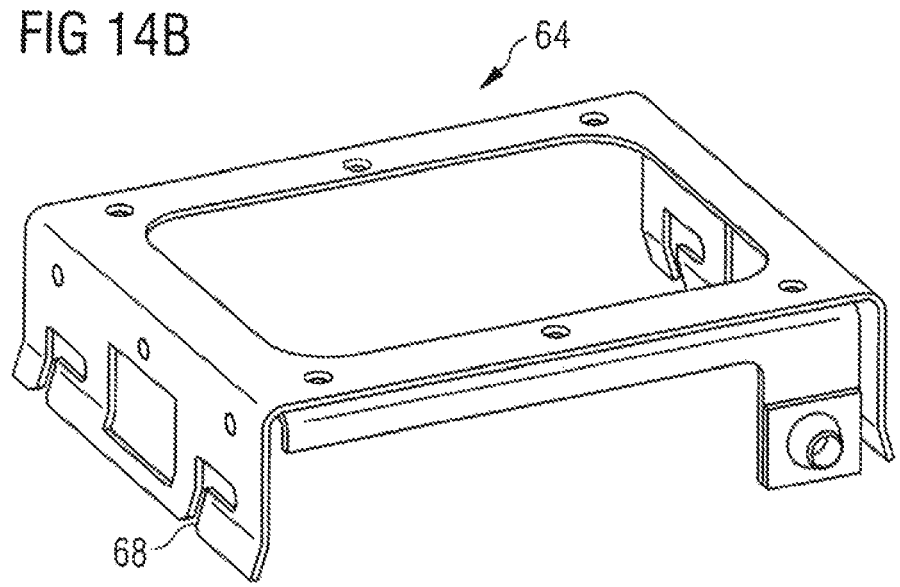
Figure 16:
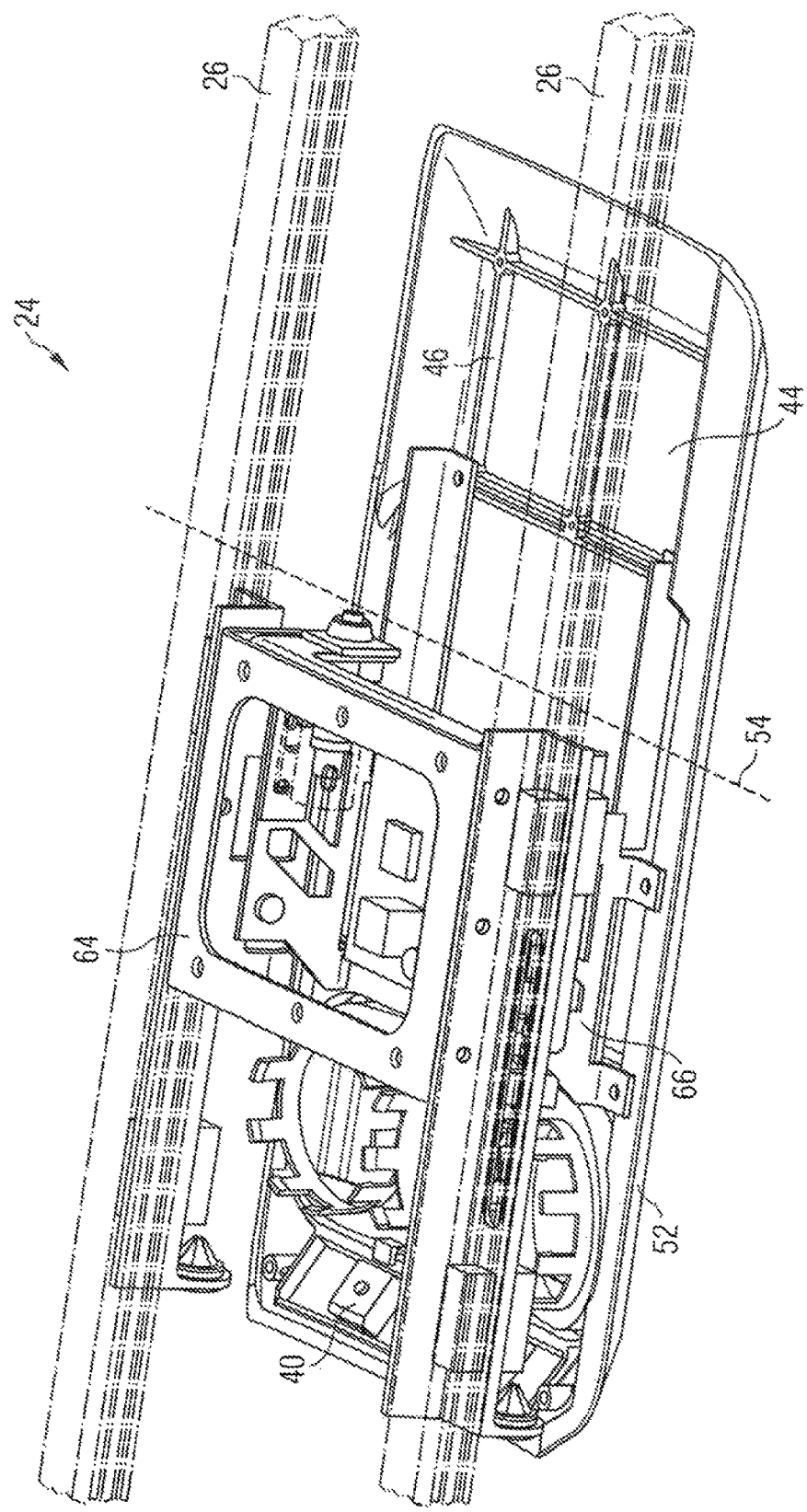
Figure 17A:
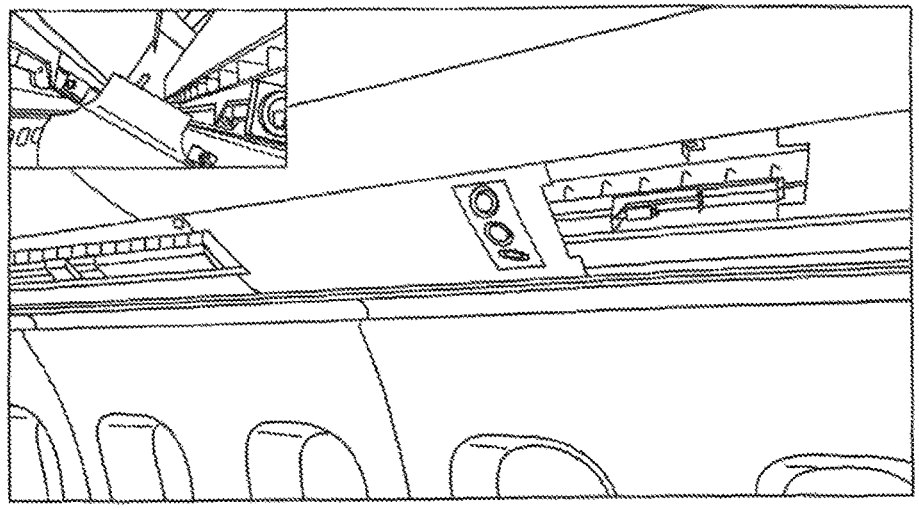
Figure 17B:
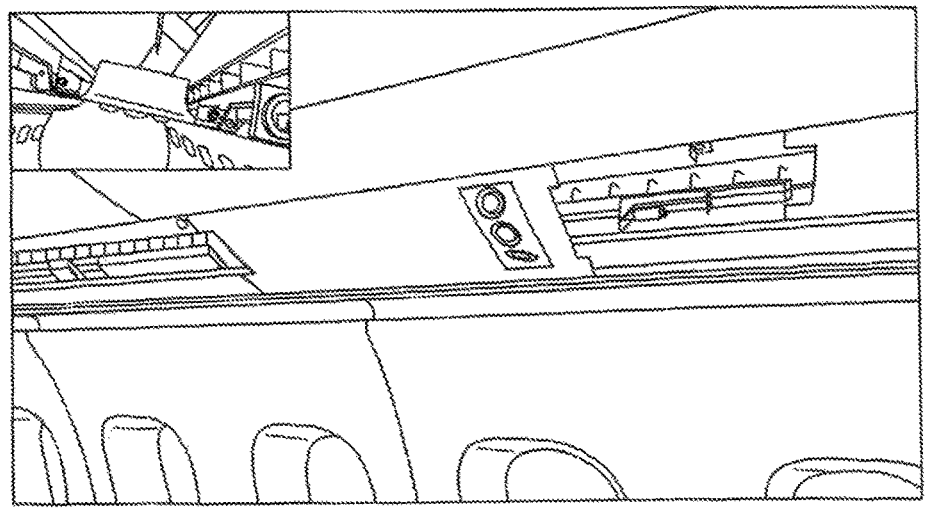

FIG. 4 and FIG. 11 show two alternative embodiments of the complementary latching device 66 of the PSU 36.

Figure 10:
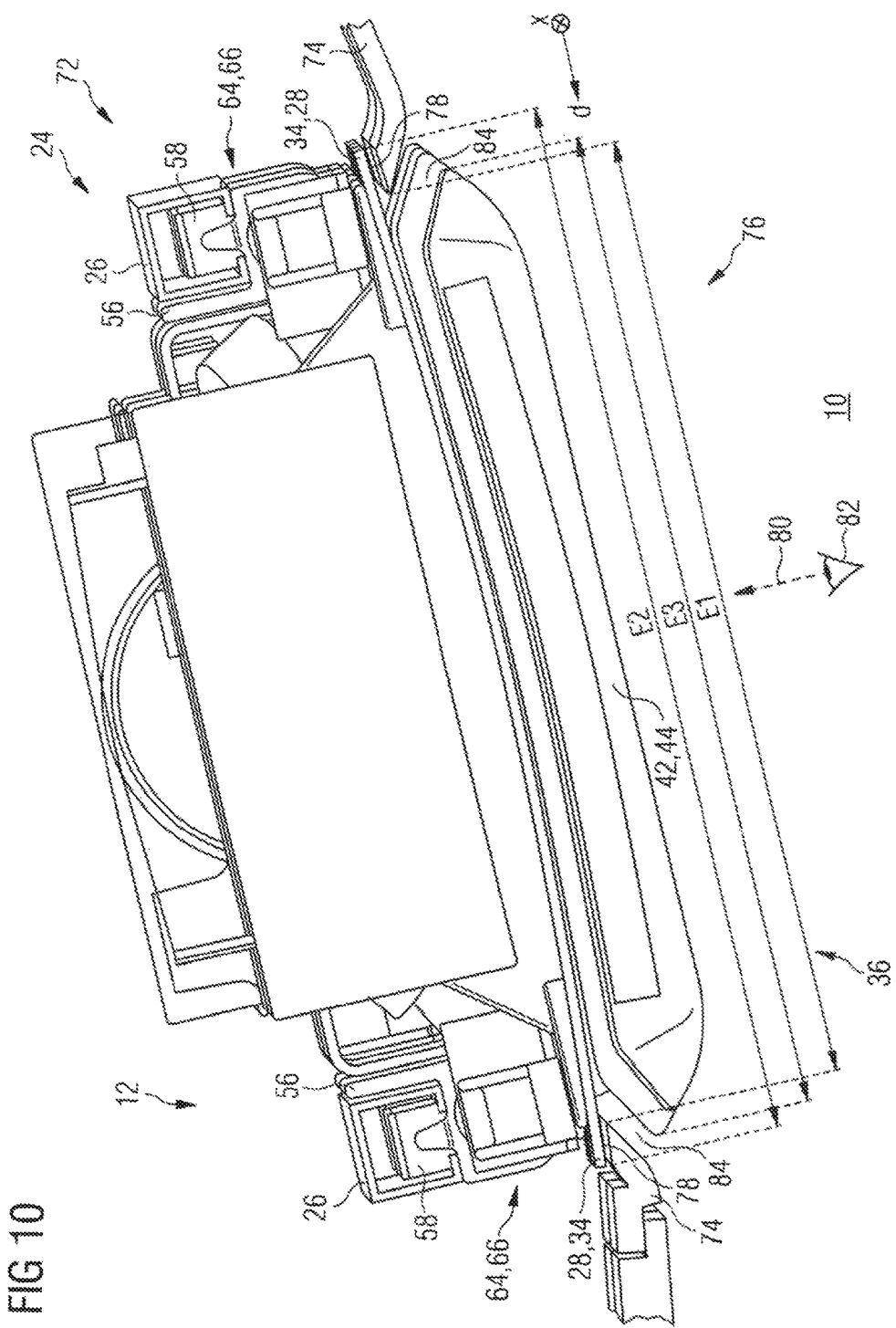

As shown in FIG. 10, a cabin arrangement 72 for installation on board an aircraft comprises a PSC 12 and a passenger supply system 24. The PSC 12 is mounted in the aircraft along longitudinal axis x of the aircraft (i.e., along the ordinary moving direction of the aircraft). The PSC 12 comprises a lining panel 74 that defines by the rims of the lining panel 74 a channel opening 76 of the PSC 12.

The indiv panel 28, the PSU 36 and the lining panel 74 are configured such that in a mounted state an extension E1 of the channel opening 76 along a direction d perpendicular to the longitudinal axis x is smaller than both an extension E2 of the indiv panel 28 and an extension E3 of the PSU 36 along the same direction d. As a result of the bigger extension E2 of the indiv panel 28 in comparison to the extension E1 of the channel opening 76, the indiv panel 28 is intrinsically held by the lining panel 74, because the indiv panel 28 is inserted into the PSC 12 such that the indiv panel 28 lies on the lining panel 74 rims defining the channel opening 76 on a side of the lining panel 74, which faces away from the cabin 10. This enables that the indiv panel 28 is supported by the lining panel 74 and that a "slit"/contact line 78 between the indiv panel 28 and the lining panel 74 is oriented out of the line of sight 80 of a passenger 82 inside the cabin 10, who looks towards the cabin arrangement 72. Therefore, the "slit"/contact line 78 is hidden from the passenger's view and is thus not recognizable.

Similar applies for a slit 84 between the PSU 36 and lining panel 74: Because of the bigger extension E3 of the PSU 36 in comparison to the extension E1 channel opening 76, the PSU 36 covers/hides at least the lining panel 74 rims defining the channel opening 76 on a side of the lining panel 74, which faces towards the cabin 10. In particular, the PSU 36 and the lining panel may 74 are configured such that in the mounted state a side of outer rims of the PSU 36 facing towards the lining panel 74 is oriented approximately parallel to a side of the outer lining panel 74 rims facing towards the PSU 36. This enables that the slit 84 between the PSU 36 and the lining panel 74 is also oriented out of the line of sight 80 of the passenger 82 and is thus hidden from the passenger's view. However, the slit 84 between the PSU 36 and the lining panel 76 still allows insertion of a tool at a specific position to switch the attaching device 58, the cooperation between the first latching device 60 and the complementary latching device 62 and/or the cooperation between the second latching device 64 and the complementary latching device 66 from a lock state to an unlock state.

In particular, the indiv panel 28, the PSU 36 and the lining panel 74 are configured such that in a mounted state the lining panel 74 is at least partially sandwiched between the indiv panel 28 and the PSU 36, see FIG. 10. As a result of the sandwiched structure, a "three layer" arrangement can be realized, in which are stacked (at least locally around the slits 78, 84) the indiv panel 28 on the top, the lining panel 74 in the middle and the PSU 36 at the bottom.

FIGS. 2, 17A, 17B, 18 and 20 show a method for installing a cabin arrangement 72 on board an aircraft. The method comprises the steps:

mounting a PSC 12 in the aircraft along a longitudinal axis x of the aircraft such that a lining panel 74 of the PSC 12 defines a channel opening 76 of the PSC 12, mounting a rail track 26 along the PSC 12;

attaching a fastening device 56 to the rail track 26 by use of an attaching device 58 of fastening device 56 (see S1 in FIG. 20);

mounting all indiv panels 28 of the passenger supply system 24 on the rail track 26 (see FIGS. 17A and 17B) by first inserting the indiv panel 28 in a tilted orientation through the channel opening 76 of the PSC 12 (see upper left insert of FIG. 17A and S2 in FIG. 20), then tilting back the indiv panel 28 and finally laying the indiv panel 28 on the lining panel 74 rims defining the channel opening 76 on a side of the lining panel 74, which faces away from the cabin 10 (see upper left insert of FIG. 17B), and attaching each indiv panel 28 to the fastening device 36 by cooperation of a first latching device 60 of the fastening device 56 with a complementary latching device 62 of the indiv panel 28 (see FIG. 2 and S3 of FIG. 20)

thereby mounting each indiv panel 28 such that the crossover area 44 of the indiv panel 28 extends in the mounted state of the indiv panel more than substantially 15 cm along the PSC 12 (see FIGS. 17A and 17B) and such that an extension E1 of the channel opening 76 along a direction d perpendicular to the longitudinal axis x is smaller than an extension. E2 of the indiv panel 28 along the same direction;

connecting all the indiv panels 28 to the PSC 12 for supplying at least one passenger with conditioned air, medical outlet and/or oxygen (see S4 in FIG. 20);

connecting all PSUs 36 of the passenger supply system 24 to the PSC 12 for supplying the at least one passenger with light, visual information and/or sound information (see S5 in FIG. 20); and mounting all the PSUs 36 on the rail track 26 such that in the mounted state of the PSUs 36 and of the indiv panels 28 an overlapping area 44 of a PSU 36 at least partially overlaps with a crossover area 34 of an indiv panel 28 directly neighboring to the PSU 36 (see FIG. 18) by attaching each PSU 36 to the fastening device 56 by cooperation of a second latching device 64 of the fastening device 56 with a complementary latching device 66 of the PSU 36 (see FIG. 2 and S6 in FIG. 20)

thereby mounting the PSUs 36 such that the overlapping area 44 of PSU 36 extends in the mounted state of the PSU 36 more than substantially 15 cm along the PSC 12 (see FIG. 18), such that the extension E1 of the channel opening 76 along the direction d perpendicular to the longitudinal axis x is smaller than an extension E3 of the PSU 36 along the same direction d and such that the lining panel 74 is at least partially sandwiched between the indiv panel 28 and the PSU 36.

A method for re-configuring a cabin arrangement 72 comprises the steps:

switching the attaching device 58 of the fastening device 56 from a state, in which the fastening device 56 is rigidly or fixedly mounted on the rail track 26, to a state, in which the fastening device 56 is slidably mounted on the rail track 26 such that the fastening device 56 together with the PSU 36 and the indiv panel 28 attached to the fastening device 56 as a whole can be slid along the rail track 26, sliding the fastening device 56 together with the PSU 36 and the indiv panel 28 along the rail track 26 to another position, switching the attaching device 58 of the fastening device 56 from the state, in which the fastening device 56 is slidably mounted on the rail track 26 such that the fastening device 56 together with the PSU 36 and the indiv panel 28 attached to the fastening device 56 as a whole can be slid along the rail track 26, to the state, in which the fastening device 56 is rigidly or fixedly mounted on the rail track 26.

Alternatively, a method for re-configuring a cabin arrangement 72 may comprise the steps:

switching the cooperation between the second latching device 64 and the complementary latching device 66 of the PSU 36 from a state, in which the PSU 36 is rigidly or fixedly locked/mounted to the fastening device 56, to a state, in which the PSU 36 is unlocked from the fastening device 56 and in which the PSU 36 is slidably mounted on the fastening device 56 such that the PSU 36 can be slid along a path 68 predetermined by the fastening device 56, removing the PSU 36 from the PCS 12 by sliding the PSU 36 along the path 68 predetermined by the fastening device 56, switching the attaching device 58 of the fastening device 56 from a state, in which the fastening device 56 is rigidly or fixedly mounted on the rail track 26, to a state, in which the fastening device 56 is slidably mounted on the rail track 26 such that the fastening device 56 together with the indiv panel 28 attached to the fastening device 56 can be slid along the rail track 26, sliding the fastening device 56 together with the indiv panel 28 along the rail track 26 to another position, switching the attaching device 58 of the fastening device 56 from the state, in which the fastening device 56 is slidably mounted on the rail track 26 such that the fastening device 56 together with the indiv panel 28 attached to the fastening device 56 can be slid along the rail track 26, to the state, in which the fastening device 56 is rigidly or fixedly mounted on the rail track 26, inserting the PSU 36 into the PSC 12 by sliding the PSU 36 along the path 68 predetermined by the fastening device 56, attaching the PSU 36 to the fastening device 56 by cooperation of the second latching device 64 with the complementary latching device 66 of the PSU 36.

Figure 19:
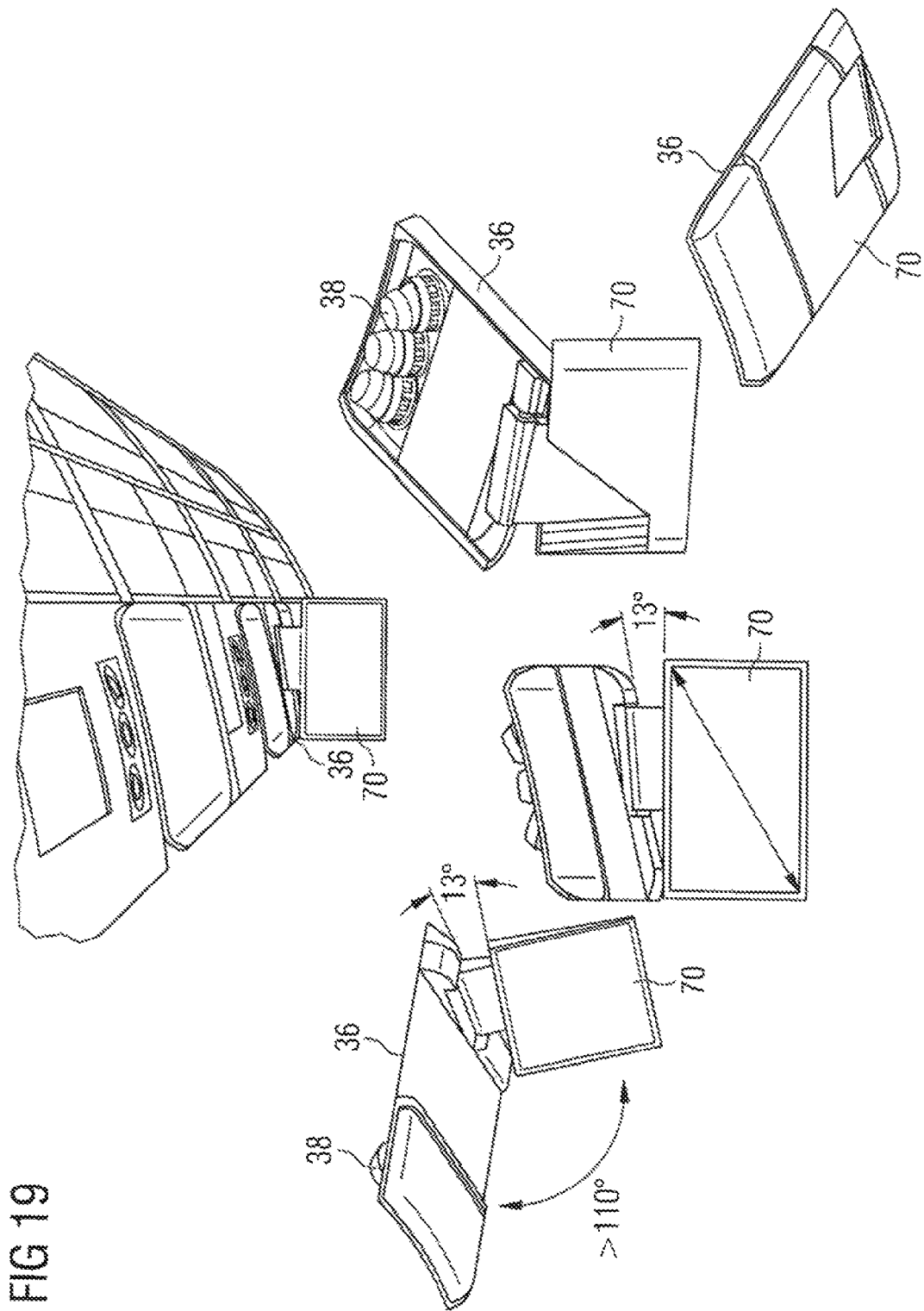

An example of a PSU 36 having a monitor 70 is shown in FIG. 19.

Unless expressly stated otherwise, identical reference symbols in the Figures stand for identical or identically-acting elements. Also, an arbitrary combination of the features and/or modifications elucidated in the Figures in connection with individual embodiments is conceivable.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A passenger supply system for installation in a passenger supply channel on board a vehicle, comprising:
    a rail track configured to be mounted along the passenger supply channel,
    a supply panel mounted on the rail track and which is connectable to the passenger supply channel for supplying at least one passenger with at least one of conditioned air, medical outlet and oxygen, the supply panel comprising at least one crossover area,
    a passenger supply unit mounted on the rail track and which is separate from the supply panel, the passenger supply unit being connectable to the passenger supply channel for supplying the at least one passenger with at least one of light, visual information and sound information, the passenger supply unit comprising at least one overlapping area,
    wherein the passenger supply unit and the supply panel are configured such that in a mounted state of the passenger supply unit and of the supply panel, the overlapping area of the passenger supply unit at least partially overlaps with the crossover area of the supply panel,
    wherein the supply panel further comprises an input/output area, through which all input/output components mounted on the supply panel are accessible to the passenger, said input/output components of the supply panel comprising at least one of at least one air nozzle, at least one medical outlet and at least one oxygen output module, wherein the input/output area of the supply panel and the crossover area of the supply panel are disjunctively arranged from each other, and
    wherein the passenger supply unit further comprises an input/output area, through which all input/output components mounted on the passenger supply unit are accessible to the passenger, said input/output components of the passenger supply unit comprising at least one of at least one lamp, at least one display element, at least one monitor, at least one loud speaker and at least one touch panel, wherein the input/output area of the passenger supply unit and the overlapping area of the passenger supply unit are disjunctively arranged from each other.

2. The passenger supply system according to claim 1, further comprising:
   a fastening device having
      an attaching device for attaching the fastening device to the rail track,
      a first latching device for cooperating with a complementary latching device of the supply panel to attach the supply panel to the fastening device, and
      a second latching device for cooperating with a complementary latching device of the passenger supply unit to attach the passenger supply unit to the fastening device.

3. The passenger supply system according to claim 1, wherein the vehicle comprises an aircraft.

4. A cabin arrangement for installation on board a vehicle, comprising:
   a passenger supply system for installation in a passenger supply channel on board a vehicle, comprising:
      a rail track configured to be mounted along the passenger supply channel,
      a supply panel mounted on the rail track and which is connectable to the passenger supply channel for supplying at least one passenger with at least one of conditioned air, medical outlet and oxygen, the supply panel comprising at least one crossover area, wherein the supply panel further comprises an input/output area, through which all input/output components mounted on the supply panel are accessible to the passenger, said input/output components of the supply panel comprising at least one of at least one air nozzle, at least one medical outlet and at least one oxygen output module, and wherein the input/output area of the supply panel and the crossover area of the supply panel are disjunctively arranged from each other, and
      a passenger supply unit mounted on the rail track and which is separate from the supply panel, the passenger supply unit being connectable to the passenger supply channel for supplying the at least one passenger with at least one of light, visual information and sound information, the passenger supply unit comprising at least one overlapping area, wherein the passenger supply unit further comprises an input/output area, through which all input/output components mounted on the passenger supply unit are accessible to the passenger, said input/output components of the passenger supply unit comprising at least one of at least one lamp, at least one display element, at least one monitor, at least one loud speaker and at least one touch panel, wherein the input/output area of the passenger supply unit and the overlapping area of the passenger supply unit are disjunctively arranged from each other,
      wherein the passenger supply unit and the supply panel are configured such that in a mounted state of the passenger supply unit and of the supply panel, the overlapping area of the passenger supply unit at least partially overlaps with the crossover area of the supply panel, and
   a passenger supply channel mountable in the vehicle along a longitudinal axis of the vehicle and which comprises a lining panel defining a channel opening of the passenger supply channel,
   wherein the supply panel, the passenger supply unit and the lining panel are configured such that in a mounted state an extension of the channel opening along a direction perpendicular to the longitudinal axis is smaller than both an extension of the supply panel and an extension of the passenger supply unit along the same direction.

5. The cabin arrangement according to claim 4, wherein the supply panel, the passenger supply unit and the lining panel defining the channel opening are configured such that in a mounted state the lining panel is at least partially sandwiched between the supply panel and the passenger supply unit.

6. The cabin arrangement according to claim 4, wherein the vehicle comprises an aircraft.

7. A method for installing a passenger supply system in a passenger supply channel on board a vehicle, comprising the steps:
   mounting a rail track along the passenger supply channel,
   mounting a supply panel on the rail track,
   connecting the supply panel to the passenger supply channel for supplying at least one passenger with at least one of conditioned air, medical outlet and oxygen,
   connecting a passenger supply unit to the passenger supply channel for supplying the at least one passenger with at least one of light, visual information and sound information,
   mounting the passenger supply unit on the rail track such that in the mounted state of the passenger supply unit and of the supply panel an overlapping area of the passenger supply unit at least partially overlaps with a crossover area of the supply panel,
   mounting on the supply panel, in an input/output area of the supply panel, at least one input/output panel component comprising at least one of at least one air nozzle, at least one medical outlet and at least one oxygen output module, such that the input/output area of the supply panel and the crossover area of the supply panel are disjunctively arranged from each other, and
   mounting on the passenger supply unit, in an input/output area of the passenger supply unit, at least one input/output passenger supply unit component comprising at least one of at least one lamp, at least one display element, at least one monitor, at least one loud speaker and at least one touch panel, such that the input/output area of the passenger supply unit and the overlapping area of the passenger supply unit are disjunctively arranged from each other.

8. The method according to claim 7, further comprising the steps:
   attaching a fastening device to the rail track by an attaching device of fastening device,
   attaching the supply panel to the fastening device by cooperation of a first latching device of the fastening device with a complementary latching device of the supply panel, and
   attaching the passenger supply unit to the fastening device by cooperation of a second latching device of the fastening device with a complementary latching device of the passenger supply unit.

9. The method according to claim 7, wherein the passenger supply system is installed in an aircraft.

10. A method for installing a cabin arrangement on board a vehicle, wherein the cabin arrangement comprises:

a passenger supply system for installation in a passenger supply channel on board a vehicle, comprising:
- a rail track configured to be mounted along the passenger supply channel,
- a supply panel mounted on the rail track and which is connectable to the passenger supply channel for supplying at least one passenger with at least one of conditioned air, medical outlet and oxygen, the supply panel comprising at least one crossover area, wherein the supply panel further comprises an input/output area, through which all input/output components mounted on the supply panel are accessible to the passenger, said input/output components of the supply panel comprising at least one of at least one air nozzle, at least one medical outlet and at least one oxygen output module, and wherein the input/output area of the supply panel and the crossover area of the supply panel are disjunctively arranged from each other, and
- a passenger supply unit mounted on the rail track and which is separate from the supply panel, the passenger supply unit being connectable to the passenger supply channel for supplying the at least one passenger with at least one of light, visual information and sound information, the passenger supply unit comprising at least one overlapping area, wherein the passenger supply unit further comprises an input/output area, through which all input/output components mounted on the passenger supply unit are accessible to the passenger, said input/output components of the passenger supply unit comprising at least one of at least one lamp, at least one display element, at least one monitor, at least one loud speaker and at least one touch panel, wherein the input/output area of the passenger supply unit and the overlapping area of the passenger supply unit are disjunctively arranged from each other,
- wherein the passenger supply unit and the supply panel are configured such that in a mounted state of the passenger supply unit and of the supply panel, the overlapping area of the passenger supply unit at least partially overlaps with the crossover area of the supply panel, and a passenger supply channel comprising a lining panel, the method comprising the steps:

providing the passenger supply system, mounting the passenger supply channel in the vehicle along the longitudinal axis of the vehicle such that the lining panel of the passenger supply channel defines a channel opening of the passenger supply channel, and mounting the supply panel, the passenger supply unit and the lining panel such that the extension of the channel opening along the direction perpendicular to the longitudinal axis is smaller than both an extension of the supply panel and an extension of the passenger supply unit along the same direction.

11. The method according to claim 10, further comprising the step:
- mounting the supply panel, the passenger supply unit and the lining panel defining the channel opening such that the lining panel is at least partially sandwiched between the supply panel and the passenger supply unit.

12. The method according to claim 10, wherein the cabin arrangement is installed in an aircraft.

\* \* \* \* \*